US011459493B2

United States Patent
Carvagno et al.

(10) Patent No.: US 11,459,493 B2
(45) Date of Patent: *Oct. 4, 2022

(54) CURABLE ACETOACETYLATED RESIN COMPOSITIONS AND ADDITIVES COMPRISING ADHESION PROMOTERS, GREEN STRENGTH ENHANCERS, OR COMBINATIONS THEREOF

(71) Applicant: Eastman Chemical Company, Kingsport, TN (US)

(72) Inventors: Terri Roxanne Carvagno, Church Hill, TN (US); Monika Karin Wiedmann Boggs, Blountville, TN (US); Shawn Marie Dougherty, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 377 days.

This patent is subject to a terminal disclaimer.

(21) Appl. No.: 16/705,338

(22) Filed: Dec. 6, 2019

(65) Prior Publication Data

US 2020/0181311 A1    Jun. 11, 2020

Related U.S. Application Data

(60) Provisional application No. 62/916,503, filed on Oct. 17, 2019, provisional application No. 62/900,939, filed on Sep. 16, 2019, provisional application No. 62/777,880, filed on Dec. 11, 2018, provisional application No. 62/777,865, filed on Dec. 11, 2018, provisional application No. 62/777,876, filed on Dec. 11, 2018, provisional application No. 62/777,871, filed on Dec. 11, 2018.

(51) Int. Cl.
*C09J 167/02* (2006.01)
*C09J 171/00* (2006.01)
(Continued)

(52) U.S. Cl.
CPC ............ *C09J 167/02* (2013.01); *C08G 12/00* (2013.01); *C08G 63/005* (2013.01); *C08G 63/87* (2013.01); *C08G 63/916* (2013.01); *C08J 3/24* (2013.01); *C08J 5/18* (2013.01); *C08J 7/043* (2020.01); *C08L 67/03* (2013.01); *C09D 7/20* (2018.01); *C09D 7/65* (2018.01); *C09D 161/20* (2013.01); *C09D 167/00* (2013.01); *C09D 167/02* (2013.01); *C09D 175/08* (2013.01); *C09J 5/00* (2013.01); *C09J 11/08* (2013.01); *C09J 161/20* (2013.01); *C09J 167/03* (2013.01); *C09J 171/00* (2013.01); *C08J 2323/06* (2013.01); *C08J 2323/12* (2013.01); *C08J 2367/02* (2013.01); *C08K 3/013* (2018.01); *C08K 5/005* (2013.01); *C08K 5/0016* (2013.01); *C08K 5/0025* (2013.01); *C08K 5/0066* (2013.01); *C08K 5/07* (2013.01); *C08K 5/18* (2013.01); *C08K 5/3462* (2013.01); *C09J 2461/00* (2013.01); *C09J 2467/00* (2013.01)

(58) Field of Classification Search
CPC .............. C09D 167/00; C09D 167/025; C09D 167/03; C09D 167/04; C09D 167/06; C09D 167/07; C09D 167/08; C09D 161/00; C09D 161/02; C09D 161/04; C09D 161/06; C09D 161/12; C09D 161/14; C09D 161/16; C09D 161/18; C09D 161/20; C09D 161/22; C09D 161/24; C09D 161/26; C09D 161/28; C09D 161/30; C09D 161/32; C09D 161/34; C09D 133/00; C09D 133/04; C09D 133/06; C09D 133/062; C09D 133/064; C09D 133/066; C09D 133/068; C09D 133/08; C09D 133/10; C09D 133/12; C09D 133/14; C09D 133/16; C09J 167/00; C09J 167/025; C09J 167/03; C09J 167/04; C09J 167/06; C09J 167/07; C09J 167/08

See application file for complete search history.

(56) References Cited

U.S. PATENT DOCUMENTS

| | | |
|---|---|---|
| 4,071,578 A | 1/1978 | Lasher |
| 4,708,821 A | 11/1987 | Shimokawa et al. |
| 5,288,804 A | 2/1994 | Kim et al. |
| 5,426,148 A | 6/1995 | Tucker |
| 5,453,464 A | 9/1995 | Witzeman et al. |

(Continued)

FOREIGN PATENT DOCUMENTS

| | | |
|---|---|---|
| DE | 196 20 351 A1 | 11/1997 |
| EP | 0 161 697 A1 | 11/1985 |
| EP | 0 687 716 A1 | 12/1995 |
| EP | 1 435 383 A1 | 7/2004 |
| GB | 1 154 725 A | 6/1969 |

(Continued)

OTHER PUBLICATIONS

Notification of Transmittal of the International Search Report and the Written Opinion of the International Searching Authority dated Mar. 20, 2020 for International Application No. PCT/US2019/064872.

(Continued)

*Primary Examiner* — Christopher M Rodd
(74) *Attorney, Agent, or Firm* — C. Stuart Everett

(57) ABSTRACT

This invention relates to a curable composition comprising:
 I. Component (I) comprising at least one resin having at least one functional group selected from the group consisting of β-ketoester and malonate functional groups,
 II. Component (II) comprising at least one curing agent having at least one aldehyde functional group, and
 III. Component (III) comprising at least one compound having amine functionality, salts thereof, or combinations thereof;
 IV. Component (IV) which is at least one additive comprising at least one adhesion promoter, at least one green strength enhancer, or combinations thereof, or wherein said at least one additive is both an adhesion promoter and a green strength enhancer.

20 Claims, No Drawings

(51) Int. Cl.

| | |
|---|---|
| *C08G 63/87* | (2006.01) |
| *C08G 63/91* | (2006.01) |
| *C09D 167/02* | (2006.01) |
| *C09D 7/20* | (2018.01) |
| *C08G 12/00* | (2006.01) |
| *C09D 161/20* | (2006.01) |
| *C09J 5/00* | (2006.01) |
| *C09J 161/20* | (2006.01) |
| *C09D 7/65* | (2018.01) |
| *C09J 11/08* | (2006.01) |
| *C08L 67/03* | (2006.01) |
| *C09J 167/03* | (2006.01) |
| *C08J 3/24* | (2006.01) |
| *C08J 7/043* | (2020.01) |
| *C08J 5/18* | (2006.01) |
| *C09D 167/00* | (2006.01) |
| *C09D 175/08* | (2006.01) |
| *C08G 63/00* | (2006.01) |
| *C08K 3/013* | (2018.01) |
| *C08K 5/00* | (2006.01) |
| *C08K 5/07* | (2006.01) |
| *C08K 5/3462* | (2006.01) |
| *C08K 5/18* | (2006.01) |

(56) References Cited

U.S. PATENT DOCUMENTS

| | | | |
|---|---|---|---|
| 5,693,705 A | 12/1997 | Kubo et al. | |
| 6,117,492 A | 9/2000 | Goldstein et al. | |
| 6,177,514 B1 | 1/2001 | Pathak et al. | |
| 6,521,716 B1 | 2/2003 | Leake | |
| 6,683,132 B1 | 1/2004 | Schick et al. | |
| 8,653,174 B2 | 2/2014 | Anderson et al. | |
| 8,664,333 B2 | 3/2014 | Shibutani et al. | |
| 8,962,725 B2 | 2/2015 | Brinkhuis et al. | |
| 9,181,452 B2 | 11/2015 | Brinkhuis et al. | |
| 9,181,453 B2 | 11/2015 | Brinkhuis et al. | |
| 9,260,626 B2 | 2/2016 | Brinkhuis et al. | |
| 9,284,423 B2 | 3/2016 | Brinkhuis et al. | |
| 9,534,081 B2 | 1/2017 | Brinkhuis et al. | |
| 9,587,138 B2 | 3/2017 | Brinkhuis et al. | |
| 9,599,602 B2 | 3/2017 | Kevil et al. | |
| 10,563,040 B2 | 2/2020 | Kuo et al. | |
| 11,261,359 B2 | 3/2022 | Boggs et al. | |
| 2002/0040093 A1 | 4/2002 | Hobel et al. | |
| 2002/0161162 A1 | 10/2002 | Kumar et al. | |
| 2003/0060655 A1 | 3/2003 | Hayashi et al. | |
| 2003/0195304 A1 | 10/2003 | Kuo et al. | |
| 2003/0195305 A1 | 10/2003 | Kuo et al. | |
| 2005/0081994 A1 | 4/2005 | Beckley et al. | |
| 2007/0048337 A1* | 3/2007 | Arthur | A61K 9/06 424/484 |
| 2008/0135060 A1 | 6/2008 | Kuo et al. | |
| 2009/0253865 A1 | 10/2009 | Shibutani et al. | |
| 2010/0204401 A1 | 8/2010 | Marsh et al. | |
| 2011/0015343 A1 | 1/2011 | Jones et al. | |
| 2012/0220676 A1 | 8/2012 | Moens | |
| 2013/0036939 A1 | 2/2013 | Webster et al. | |
| 2013/0233739 A1 | 9/2013 | Zhao et al. | |
| 2015/0024195 A1* | 1/2015 | Bammel | C09D 133/04 428/341 |
| 2016/0068707 A1 | 3/2016 | Drijfhout | |
| 2016/0115345 A1 | 4/2016 | Kuo et al. | |
| 2016/0115347 A1 | 4/2016 | Kuo et al. | |
| 2016/0137877 A1 | 5/2016 | Kuo et al. | |
| 2016/0297994 A1 | 10/2016 | Kuo et al. | |
| 2017/0275492 A1 | 9/2017 | Zhou et al. | |
| 2018/0251656 A1 | 9/2018 | Geodegebuure et al. | |
| 2020/0140693 A1 | 5/2020 | Gessner et al. | |
| 2020/0181311 A1 | 6/2020 | Carvagno et al. | |
| 2020/0181312 A1 | 6/2020 | Dougherty et al. | |
| 2020/0181324 A1 | 6/2020 | Dougherty et al. | |
| 2020/0181395 A1 | 6/2020 | Dougherty et al. | |
| 2020/0181465 A1 | 6/2020 | Kuo et al. | |

FOREIGN PATENT DOCUMENTS

| | | |
|---|---|---|
| JP | 556 5847 A | 1/1981 |
| JP | 3284984 A | 12/1991 |
| JP | H07331133 A | 12/1995 |
| JP | H11310723 A | 11/1999 |
| JP | 3386577 A | 3/2003 |
| WO | WO 96/41833 A1 | 12/1996 |
| WO | WO 2017/186899 A1 | 11/2017 |

OTHER PUBLICATIONS

Notification of Transmittal of the International Search Report and the Written Opinion of the International Searching Authority dated Mar. 20, 2020 for International Application No. PCT/US2019/064878.

Notification of Transmittal of the International Search Report and the Written Opinion of the International Searching Authority dated Mar. 20, 2020 for International Application No. PCT/US2019/064883.

Notification of Transmittal of the International Search Report and the Written Opinion of the International Searching Authority dated Mar. 20, 2020 for International Application No. PCT/US2019/064893.

Co-pending U.S. Appl. No. 15/621,323, filed Jun. 13, 2017; Kuo et al.

Office Action dated Feb. 25, 2019 received in co-pending U.S. Appl. No. 15/621,323.

Office Action dated Jul. 15, 2019 received in co-pending U.S. Appl. No. 15/621,323.

Notice of Allowance dated Oct. 24, 2019 received in co-pending U.S. Appl. No. 15/621,232.

Co-pending U.S. Appl. No. 16/705,331, filed Dec. 6, 2019; Kuo et al.

Co-pending U.S. Appl. No. 16/705,34.5 filed Dec. 6, 2019; Dougherty et al.

Co-pending U.S. Appl. No. 16/705,3.51 filed Dec. 6, 2019; Dougherty et al.

Co-pending U.S. Appl. No. 16/705,365, filed Dec. 6, 2019; Boggs et al.

Co-pending U.S. Appl. No. 16/705,377 filed Dec. 6, 2019; Dougherty et al.

Co-pending U.S. Appl. No. 16/705,394, filed Dec. 6, 2019; Collins et al.

Co-pending U.S. Appl. No. 16/705,324, filed Dec. 6, 2019; Kuo et al.

ASTM D1003; Standard Test Method for Haze and Luminous Transmittance of Transparent Plastics.

ASTM D2578; Standard Test Method for Wetting Tension of Polyethylene and Polypropylene Films.

ASTM D3236; Standard Test Method for Apparent Viscosity of Hot Melt Adhesives and Coating Materials.

ASTM D3985; Standard Test Method for Oxygen Gas Transmission Rate Through Plastic Film and Sheeting Using a Coulometric Sensor.

ASTM D4366; Standard Test Method for Hardness of Organic Coatings by Pendulum Damping Tests.

ASTM D4752-10; Standard Practice for Measuring Mei( Resistance of Ethyl Silicate (Inorganic) Zinc-Rich Primers by Solvent Rub.

ASTM D5402; Standard Practice for Assessing the Solvent Resistance of Organic Coatings Using Solvent Rubs.

ASTM D6493-11; Standard Test Methods for Softening Point of Hydrocarbon Resins and Rosin Based Resins by Automated Ring-and-Ball Apparatus.

ASTM D7253-16; Standard Test Method for Polyurethane Raw Materials: Determination of Acidity as Acid Number for Polyether Polyols.

ASTM D974; Standard Test Method for Acid and Base Number by Color-Indicator Titration.

(56) References Cited

OTHER PUBLICATIONS

ASTM E222-17; Standard Test Methods for Hydroxyl Groups Using Acetic Anhydride Acetylation.
ASTM F1249; Standard Test Method for Water Vapor Transmission Rate Through Plastic Film and Sheeting Using a Modulated Infrared Sensor.
ASTM F2622; Standard Test Method for Oxygen Gas Transmission Rate Through Plastic Film and Sheeting Using Various Sensors.
ASTM G155; Standard Practice for Operating Xenon Arc Light Apparatus for Exposure of Non-Metallic Materials.
Blank et al.; "Delayed (Latent) Catalysis in Coatings;" www.researchgate.net/publication/228420884.
Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees with Date of Mailing Aug. 23, 2018 received in International Application No. PCT/US2018/036237.
Noomen; "Applications of Michael addition chemistry in coatings technology"; Progress in Organic Coatings; 32; (1997); pp. 137-142.
Notification of Transmittal of the International Search Report and the Written Opinion of the International Searching Authority dated Aug. 24, 2018 for International Application No. PCT/US2018/036244.
Notification of Transmittal of the International Search Report and the Written Opinion of the International Searching Authority dated Nov. 6, 2018 for International Application No. PCT/US2018/036237.
Notification of Transmittal of the International Search Report and the Written Opinion of the International Searching Authority dated Feb. 24, 2020 for International Application No. PCT/US2018/060816.
Notification of Transmittal of the International Search Report and the Written Opinion of the International Searching Authority dated Feb. 25, 2020 for International Application No. PCT/US19/64868.
Notification of Transmittal of the International Search Report and the Written Opinion of the International Searching Authority dated Apr. 7, 2020 for International Application No. PCT/US19/64870.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Co-pending U.S. Appl. No. 17/309,118, filed Apr. 27, 2021; Kuo et al.
Co-pending U.S. Appl. No. 17/309,121, filed Apr. 27, 2021; Kuo et al.
Non-Final Office Communication dated Jun. 9, 2021 received in U.S. Appl. No. 16/705,365.
Notice of Allowance and Fee(s) Due dated Oct. 22, 2021 received in U.S. Appl. No. 16/705,365.
Office Action dated Mar. 17, 2022 received in co-pending U.S. Appl. No. 16/705,377.
Office Communication dated Jun. 14, 2021 received in U.S. Appl. No. 16/705,324.
Office Communication dated Jan. 7, 2022 received in U.S. Appl. No. 16/705,324.
Notification of Transmittal of the International Search Report and the Written Opinion of the International Searching Authority dated Jun. 2, 2020 for International Application No. PCT/US2019/064876.
Office Action dated Mar. 29, 2022 received in co-pending U.S. Appl. No. 16/705,331; Now U.S. Publication No. 2020-0181465; Kuo et al.
Office Action dated Apr. 1, 2022 received in co-pending U.S. Appl. No. 16/705,345.
Office Action dated February 22, 2022 received in co-pending U.S. Appl. No. 16/705,351.
USPTO Office Action dated Jun. 9, 2022 received in U.S co-pending U.S. Appl. No. 16/705,394.
USPTO Office Action dated May 11, 2022 received in U.S. co-pending U.S. Appl. No. 16/705,324.
Photogenerated Base in Polymer Curing & Imaging: Radiation-induce Crosslinking via a Knoevenagel Reaction authored by Urankar et al. and published in Polymer Preprints (1994) 35, 933-934.

* cited by examiner

CURABLE ACETOACETYLATED RESIN COMPOSITIONS AND ADDITIVES COMPRISING ADHESION PROMOTERS, GREEN STRENGTH ENHANCERS, OR COMBINATIONS THEREOF

CROSS-REFERENCE TO RELATED APPLICATIONS

This application claims the benefit of U.S. Provisional Application Nos. 62/777,876, 62/777,865, 62/777,871, 62/777,880 all filed Dec. 11, 2018; 62/900,939 filed Sep. 16, 2019; and 62/916,503 filed Oct. 17, 2019 under 35 U.S.C. § 119(e)(1); the entire contents of the provisional applications are hereby incorporated by reference.

FIELD OF THE INVENTION

The present invention relates to a curable composition having β-ketoester group(s), compounds having aldehyde functionality, and primary amines or secondary amines or their salts and/or mixtures of such amines, and additives comprising at least one adhesion promoter, at least one green strength enhancer, or combinations thereof, or wherein said at least one additive is both an adhesion promoter and a green strength enhancer.

BACKGROUND OF THE INVENTION

Reactive compositions based on isocyanate crosslinkers are widely used for coating and adhesive applications. Such systems are curable at room temperature or low temperatures (e.g. <100° C.) and are capable of providing the desirable properties for a variety of applications. However, there have been increasing concerns associated with the production and the use of isocyanate compounds and formulations based on isocyanates.

Compositions based on isocyanate crosslinkers frequently require reaction with moisture to form the crosslinked composition. If a solvent-based system is used due to application equipment or other reasons, it is desirable that trace moisture in the solvent will not initiate curing or crosslinking of the curable composition and thus will not reduce the pot life of the curable composition.

Commercially, it is desirable that the system does not: generate by-products during curing that can be detrimental to film formation or quality, have volatility, cause defects, have adhesion failure, and/or have unpleasant odor.

In addition, there is a need in commerce for a system that has combination of two or more of the following properties: isocyanate free, curable at low temperatures, good thermal and/or UV stability, and good adhesion to substrates typically bonded or coated with isocyanate-containing systems. It is also desirable to have a curable system that is applied and cured below about 100° C. while providing suitable adhesion at service temperatures up to 130° C. Additionally, there is a need in the art for a curable composition that has the desired level of adhesion to the substrate to which it is applied and that also adheres to many different substrates. Further, there is a need in the art for curable compositions having high reactivity that would only undergo cure or be activated when desired.

It is also desirable to have curable compositions with enhanced adhesion to substrates and that have enhanced green strength.

SUMMARY OF THE INVENTION

In view of the above commercial shortcomings in the art, the present disclosure addresses the need for properties in curable compositions including one or more of the following properties: (1) a system that cures and that is isocyanate free, (2) curable at low temperatures (e.g. <100° C.), (3) suitable adhesion at service temperatures up to 130° C., (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, impact strength, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

The compositions of this invention can provide desirable properties for a variety of applications. In certain embodiments, the compositions of this invention can be suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

For the ease of reference but not intending to be limiting in any way, certain aspects of the disclosure are numbered consecutively, as follows:

In aspect 1 of the invention, there is provided a curable composition comprising:
I. Component (I) comprising at least one resin having at least one functional group selected from the group consisting of β-ketoester and malonate functional groups,
II. Component (II) comprising at least one curing agent having at least one aldehyde functional group,
III. Component (III) comprising at least one compound having amine functionality, salts thereof, or combinations thereof; and
IV. Component (IV) which is at least one additive comprising at least one adhesion promoter, at least one green strength enhancer, or combinations thereof, or wherein said at least one additive is both an adhesion promoter and a green strength enhancer.

In aspect 2 of the invention, there is provided the compositions of aspect 1 wherein Component (I) is selected from at least one amorphous polyester, at least one semi-crystalline polyester, or at least one polyether, or combinations thereof.

In aspect 3 of the invention, there is provided a composition of aspects 1 or 2 wherein the equivalent ratio of the acetoacetate functional group in the polyester to the aldehyde functional group in Component (II) (i.e. eq. of acetoacetate/eq. of aldehyde) can be from about 4 to about 0.25; or from about 4 to about 0.5; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In aspect 4 of the invention, there is provided the compositions of any of aspects 1-3 wherein the adhesion promoter is at least one tackifier resin.

In aspect 5 of the invention, there is provided the compositions of aspect 4 wherein at least one said tackifier resin is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, terpene resins, terpene phenolic resins, terpene styrene resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof.

In aspect 6 of the invention, there is provided the compositions of aspect 5 wherein said tackifier resin is selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and combinations thereof.

In aspect 7 of the invention, there is provided the compositions of any one of aspects 4-6 wherein said additive is a tackifier which is present in an amount from about 1 phr to about 70 phr, or from about 10 phr to about 60 phr, or from about 10 phr to about 25 phr, based on the total weight of Component (I), the resin.

In aspect 8 of the invention, there is provided the compositions of any one of aspects 1-7 wherein the green bond strength of the composition is increased by addition of Component (IV).

In aspect 9 of the invention, there is provided the compositions of any one of aspects 1-8 wherein Component (II) comprises at least one curing agent having at least two aldehyde functional groups.

In aspect 10 of the invention, there is provided the compositions of any one of aspects 1-9 wherein Component (I) comprises at least one resin having at least two functional groups selected from the group consisting of β-ketoester and malonate functional groups.

In aspect 11 of the invention, there is provided the compositions of any one of aspects 1-10 which is then cured into a cured composition.

In aspect 12 of the invention, there is provided the compositions of any one of aspects 1-11 wherein the 180-degree peel adhesion and/or T-peel strength of the cured composition is greater than when a tackifier resin or other adhesion promoter is not present in the same composition.

In aspect 13 of the invention, there is provided the compositions of any one of aspects 1-12 wherein the 180-degree peel adhesion of the cured composition is at least 100 percent greater than when tackifier or other adhesion promoter is not present in the same composition.

In aspect 14 of the invention, there is provided the compositions of any one of aspects 1-13 wherein Component (III) comprises at least one amine having primary, secondary, or tertiary amine functionality, or combinations thereof.

In aspect 15 of the invention, there is provided the compositions of any one of aspects 1-14 which is an adhesive composition or a coating composition.

In aspect 16 of the invention, there is provided a process of applying at least one composition of any of aspects 1-15 to a substrate and subsequently laminating to another substrate.

In aspect 17 of the invention there is provided a process of applying at least one composition of any of aspects 1-15 comprising:
a. applying the curable composition in any order to the surface of at least one layer of a substrate,
b. forming a laminate by contacting the surfaces to be adhered each with the other, and
c. curing said curable composition.

In aspect 18 of the invention there is provided an article of manufacture comprising at least one composition of any of aspects 1-15.

In aspect 19 of the invention there is provided an article of manufacture comprising at least one composition of aspect 18 or any of the processes of aspects 16 or 17 selected from at least one of the following:
an adhesive, a laminate, a tape, a label, a tag, a radio frequency identification (RFID) tag, a coating, a sealant, a flexible or non-flexible film, a foam, a potting compound, a disposable hygiene article, a fiberglass reinforced plastic, a compound, an assembly part, a motor vehicle molded part, a motor vehicle extruded part, a motor vehicle laminated part, a furniture part, fabric, a woven textile, a nonwoven, a flexible packaging multilayer;
wherein the adhesive is selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, assembly part adhesive, structural adhesive, pressure sensitive adhesive, pressure sensitive adhesive tape, pressure sensitive adhesive label, pressure sensitive adhesive protective film, laminating adhesive, packaging adhesive, flexible film adhesive, flexible packaging adhesive, hygiene core integrity adhesive, hygiene core integrity adhesive, and solvent-based adhesives.

In aspect 20 of the invention there is provided an article of manufacture of aspect 19 comprising at least one adhesive or at least one coating.

In aspect 21 of the invention there is provided an article of manufacture of aspect 20 comprising at least one reactive adhesive.

In aspect 22 of the invention there is provided an article of manufacture of aspect 19 wherein said composite is selected from at least one of a polyester composite, a glass composite, or a wood-plastic composite.

In aspect 23 of the invention there is provided an article of manufacture of aspect 19 wherein said compound is selected from at least one of an extruded compound, a polyacrylic blended compound, a potting compound, a rubber compound, a sheet molding compound or a dough molding compound.

Compositions based on such acetoacetyl-functionalized Component (I) compounds are especially suitable for low-temperature curing adhesive applications without the use of isocyanates. The compositions of the invention comprising primary and/or secondary amines offer several property improvements including but not limited to curability and good thermal stability. The primary and/or secondary amines useful in the invention can act as catalyst and/or activating agent for the compositions of the invention.

Additionally, the compositions of the invention do not require moisture, so they can be used with a variety of substrates as described herein including but not limited to moisture-impermeable substrates such as artificial leather.

Unpredictably, the compositions useful in this invention have a good combination of properties including but not limited to good thermal stability, the ability to cure and/or crosslink, good cure rate, good green strength, good peel strength, and ability to adhere to various substrates.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to "a polyester," "a dicarboxylic acid", "a residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified.

It has been discovered that compositions comprising polyesters having moieties containing activated methylene or methine groups, such as those of β-ketoesters, have properties including but not limited to one or more of the following properties: (1) a system that cures and that is isocyanate free, (2) curable at low temperatures (e.g. <100° C.), (3) suitable adhesion at service temperatures up to 130° C., (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, impact strength, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

In one embodiment of the invention, there are provided compositions comprising: (I) a first component having at least one or at least two or more functional groups selected from the group consisting of 3-ketoester and malonate functional groups; (II) a second component having at least one or at least two aldehyde functional groups, or isomers thereof, or combinations thereof; (III) a third component comprising an activating agent or at least one catalyst such as a basic catalyst; and (IV) a fourth component which is at least one additive comprising at least one adhesion promoter, at least one green strength enhancer, or combinations thereof, or wherein said at least one additive is both an adhesion promoter and a green strength enhancer.

In one embodiment of the invention, there are provided compositions comprising: (I) a first component having at least one or at least two or more functional groups selected from the group consisting of 3-ketoester and malonate functional groups; (II) a second component having at least one or at least two aldehyde functional groups, or isomers thereof, or combinations thereof; (III) a third component comprising at least one amine, salts thereof, or combinations thereof; and (IV) a fourth component which is at least one additive comprising at least one adhesion promoter, at least one green strength enhancer, or combinations thereof, or wherein said at least one additive is both an adhesion promoter and a green strength enhancer.

In one embodiment of the invention, there are provided compositions comprising: (I) a first component having at least one or at least two or more functional groups selected from the group consisting of R-ketoester and malonate functional groups; (II) a second component having at least one or at least two aldehyde functional groups, or isomers thereof, or combinations thereof; (III) a third component comprising at least one primary amine and/or at least one secondary amine, salts thereof, or combinations thereof; and (IV) a fourth component which is at least one additive comprising at least one adhesion promoter, at least one green strength enhancer, or combinations thereof, or wherein said at least one additive is both an adhesion promoter and a green strength enhancer.

In one embodiment of the invention, there are provided compositions comprising:
I. a first component comprising at least one amorphous or semi-crystalline polyester or at least one polyether having at least one or at least two functional groups selected from the group consisting of β-ketoester and malonate functional groups,
II. a second component comprising at least one or at least two aldehyde functional groups, or isomers thereof, or combinations thereof,
III. a third component comprising at least one primary amine and/or at least one secondary amine, salts thereof, or combinations thereof, and
IV. a fourth component which is at least one additive comprising at least one adhesion promoter, at least one green strength enhancer, or combinations thereof, or wherein said at least one additive is both an adhesion promoter and a green strength enhancer.

In one embodiment of the invention, there are provided compositions comprising:
I. a first component comprising at least one amorphous or semi-crystalline polyester or at least one polyether having at least two functional groups selected from the group consisting of 1-ketoester and malonate groups,
II. a second component comprising at least two aldehyde functional groups, or isomers thereof, or combinations thereof,
III. a third component comprising at least one primary amine and/or at least one secondary amine, salts thereof, or combinations thereof, and
IV. a fourth component which is at least one additive comprising at least one adhesion promoter, at least one green strength enhancer, or combinations thereof, or wherein said at least one additive is both an adhesion promoter and a green strength enhancer.

In one embodiment of the invention, there are provided compositions wherein the polyester is an acetoacetate functional polyester comprising the residues of
a. a hydroxyl component comprising:
i. at least one diol in an amount ranging from 0 to 100 mole % or 50 to 100 mole %, based on the total moles of (i) and (ii) equaling 100 mole %; and
ii. at least one polyol in an amount ranging from 0 to 100 mole % or 0 to 50 mole %, based on the total moles of (i) and (ii) equaling 100 mole %;
b. at least one carboxyl component comprising a polycarboxylic acid compound, a derivative of a polycarboxylic acid compound, or a combination thereof; and
c. at least one compound selected from an alkyl acetoacetate, a diketene, or a combination thereof.

The β-ketoester groups are represented by Formula 1, wherein R is a branched or straight chain, saturated or unsaturated alkyl, alicyclic, or aromatic group; R' is a hydrogen or a branched or straight chain, saturated or unsaturated alkyl, alicyclic, or aromatic group.

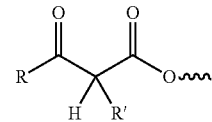

1

The equivalent ratio of the β-ketoacetate functional groups in the resin(s) of Component (I) to the aldehyde functional groups in the composition is defined as the ratio of the equivalents of β-ketoacetate functional groups or acetoacetate (AcAc) functional groups in the polyester to the equivalents of aldehyde functional groups in the composition. For example, the equivalents of the AcAc functional group in a sample of 100 g AcAc polyester with AcAc number of 120 mgKOH/g can be calculated by the formula: equivalents of AcAc polyester=100×120/56100=0.21; whereas the equivalents of the aldehyde functional group in a sample of 0.10 moles of a dialdehyde is equal to 0.10× 2=0.20. Thus, the equivalent ratio is equal to 0.21/0.20=1.05.

In one embodiment, the equivalent ratio of the acetoacetate functional group in the polyester to the aldehyde functional group in Component (II) (i.e. eq. of acetoacetate/eq. of aldehyde) can be from about 4 to about 0.25; or from about 4 to about 0.5; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In one embodiment, the equivalent ratio of the acetoacetate functional group in the polyester to the aldehyde functional group in Component (II) (i.e. eq. of acetoacetate/eq. of aldehyde) can be from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95.

In one embodiment of the invention, there is provided compositions wherein the equivalent ratio of the acetoacetate (AcAc) functional group of Component (I) to the aldehyde functional group is from 5:1 to 1:3, or 5:1 to 1:2, or 5:1 to 1:1; or 1:4 to 4:1; or 1:2 to 1:0.8; or 1:0.3 to 1:1.2; or 1:0.5 to 1:1.2; or 1:0.7 to 1:1.3; or 1:0.9 to 1:1.1.

The polyesters useful in the invention can contain two or more 1-ketoester groups, represented by Formula 2, wherein Z is a polyester residue, R is an alkyl group, R' is hydrogen or an alkyl group and n represents the average number of β-ketoester groups per polymer chain and is an average of at least 2. In one embodiment, the β-ketoester group is acetoacetate (AcAc), and the polyester is an acetoacetate-functional polyester.

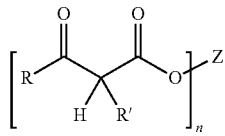

The acetoacetate-functional polyester may be prepared by reacting a polyester resin containing hydroxyl groups, for example, a polyester having a hydroxyl number of at least 5 mg KOH/g, in one embodiment, about 30 to 200 mg KOH/g, with diketene or a compound having the 1-ketoester moiety such as t-butylacetoacetate (tBAA). Various methods for the preparation of acetoacetylated polyester coating resins have been described by Witzeman et al. in the Journal of Coatings Technology, Vol. 62, No. 789, pp. 101-112 (1990). A reaction mixture can include: (a) from about 50 to about 95 weight %, or from about 60 to about 99 weight %, or from about 65 to about 95 weight %, or from about 70 to about 95 weight %, or from about 50 to about 90 weight %, or from about 60 to about 90 weight %, or from about 65 to about 90 weight %, or from about 70 to about 90 weight %, or from about 70 to about 85 weight %, or from about 70 to about 80 weight %, of hydroxyl-functional polyester; and (b) residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %; or from about 10 to about 30 weight %; or from about 15 to about 30 weight %; or from about 20 to about 30 weight %; based on the total weight percentages of (a) and (b) equaling 100 weight %.

In one embodiment of the invention, there are provided compositions wherein the residues of alkyl acetoacetate, diketene, or combinations thereof are present in an amount ranging from about 15 to about 30 weight %.

In one embodiment of the invention, there are provided compositions wherein the diol component (a)(i) is present in an amount ranging from about 35 to about 100; or from about 30 to about 95; or from about 35 to about 95; or from about 50 to about 95; or from about 50 to about 100; or from about 60 to about 100; or from about 60 to about 95; or from about 60 to about 90; or from about 60 to about 80; or from about 70 to 90; or from about 70 to 86; or from about 70 to 80 mole %; and the polyol component (a)(ii) is present in an amount ranging from about from about 0 to about 65; or from about 5 to about 65; or from 0 to about 50; or from about 5 to about 50; or from about 10 to about 50; or from about 0 to about 40; or from about 5 to about 40; or from about 10 to about 40; or from about 5 to about 30; or from about 10 to about 30; or from about 15 to about 30; or from about 14 to about 30; or from about 20 to 30 mole %; or from about 5 to about 15 mole %; wherein the total mole % of (a)(i) (diol component) and (a)(ii) (polyol component) equals 100 mole %.

In one embodiment of the invention, there are provided compositions wherein the polyester is an acetoacetate functional polyester comprising the residues of a. a hydroxyl component comprising:
  i. at least one diol in an amount ranging from about 60 to about 90 mole %, based on the total moles of (i) and (ii); and
  ii. a polyol in an amount ranging from about 10 to about 40 mole %, based on the total moles of (i) and (ii);
b. at least one carboxyl component comprising a polycarboxylic acid compound, a derivative of polycarboxylic acid compound, or a combination thereof; and
c. at least one compound selected from an alkyl acetoacetate, a diketene, or a combination thereof in an amount ranging from about 5 to about 65 weight %, based on the total weight of (a), (b), and (c).

In one embodiment of the invention, there are provided compositions, comprising residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %, or from about 10 to about 30 weight %, based on the total weight percentages of (a), (b), and (c) equaling 100 weight %.

In one embodiment of the invention, there are provided compositions comprising residues of at least one polyol component such as 1,1,1-trimethylolpropane, 1,1,1-trimethylolethane, glycerin, pentaerythritol, erythritol, threitol, dipentaerythritol, sorbitol, and the like or combinations thereof.

In one embodiment of the invention, there are provided compositions comprising residues of at least one polyol component selected from 1,1,1-trimethylolpropane, pentaerythritol or combinations thereof.

In one embodiment of the invention, there are provided compositions wherein the polyol component comprises from 0.01 to 50 mole %; or from 0.01 to 45 mole %; or from 5 to 50 mole %; or from 10 to 50 mole %; or from 5 to 40 mole %; or from 10 to 40 mole %; or from 15 to 40 mole %; or from 5 to 35 mole %; or from 10 to 35 mole %; or from 15 to 35 mole %; or from 5 to 30 mole %; or from 10 to 30 mole %; or from 15 to 30 mole % of polyol residues based on the total mole percentages of the diol component and the polyol component equaling 100 mole %.

The hydroxyl functional polyester that is used to prepare acetoacetate polyesters useful in the invention is typically synthesized by reacting a hydroxyl compound, for example, a diol or triol, with a carboxyl compound, for example, a dicarboxylic acid. Examples of hydroxyl compounds include diols such as 2,2-dimethyl-1,3-propanediol (neopentyl glycol), 2-methyl-1,3-propanediol (MPD), tricyclodecanedimethanol, 2-butyl-2-ethyl-1,3-propanediol, 1,4-butanediol, 1,6-hexanediol (HD), 1,2-cyclohexanedimethanol, 1,3-cyclohexanedimethanol, 1,4-cyclohexanedimethanol (CHDM), 2,2,4-trimethyl-1,3-pentanediol, hydroxypivalyl hydroxypivalate, 2,2,4,4-tetramethylcyclobutane-1,3-diol (TMCD), ethylene glycol, diethylene glycol, triethylene glycol, polyethylene glycol (PEG), or combinations thereof.

In one embodiment of the invention, there are provided compositions wherein the polyesters can comprise residues of at least one diol component selected from the group consisting of neopentyl glycol, 2-methyl-1,3-propanediol, 1,6-hexanediol, 1,4-cyclohexanedimethanol, 2,2,4,4-tetramethylcyclobutane-1,3-diol, or combinations thereof.

In one embodiment of the invention, there are provided compositions wherein the polyesters can comprise 2-methyl-1,3-propanediol residues.

In one embodiment of the invention, there are provided compositions wherein the polyesters can comprise from 0 to 90 mole %; or from 5 to 90 mole %; or from 10 to 90 mole %; 0 to 80 mole %; or from 5 to 80 mole %; or from 10 to 80 mole %; or from 15 to 80 mole %; or from 20 to 80 mole %; or from 25 to 80 mole %; or from 35 to 80 mole %; or from 0 to 70 mole %; or from 5 to 70 mole %; or from 10 to 70 mole %; or from 15 to 70 mole %; or from 20 to 70 mole %; or from 25 to 70 mole %; or from 35 to 70 mole % of 2-methyl-1,3-propanediol residues, based on the total mole percentages of the diol component and the polyol component equaling 100 mole %.

In one embodiment of the invention, there are provided compositions wherein the polyesters can comprise from 5 to 40 mole %; or from 5 to 35 mole %; or from 5 to 30 mole % of 2-methyl-1,3-propanediol residues.

In one embodiment of the invention, there are provided compositions wherein the polyesters can comprise neopentyl glycol residues. In one embodiment of the invention, there are provided compositions wherein the polyester does not comprise neopentyl glycol residues.

In one embodiment of the invention, there are provided compositions wherein the polyesters can comprise from 0 to 50 mole %; or from 0 to 45 mole %; or from 0.01 to 50 mole %; or from 0.01 to 45 mole %; or from 5 to 35 mole %; or from 20 to 50 mole %; or from 20 to 45 mole %; or from 25 to 50 mole %; or from 25 to 45 mole %; or from 30 to 45 mole % of neopentyl glycol residues.

In one embodiment of the invention, there are provided compositions wherein the polyesters can comprise a total of 70 mole % of 2-methyl-1,3-propanediol residues and neopentyl glycol residues, based on a total mole percentage of the diol component and the polyol component equaling 100 mole % of the hydroxyl component.

In one embodiment of the invention, there are provided compositions wherein the polyesters can comprise residues of 1,4-cyclohexanedimethanol.

In one embodiment of the invention, there are provided compositions wherein the polyesters can comprise from 15 to 85 mole %; or from 20 to 80 mole %; or from 35 to 80 mole %; or from 40 to 75 mole %; or from 60 to 85 mole %; or from 65 to 80 mole %; or from 60 to 75 mole % of 1,4-cyclohexanedimethanol residues.

In one embodiment of the invention, there are provided compositions wherein the polyesters can comprise 1,6-hexanediol residues.

In one embodiment of the invention, there are provided compositions wherein the polyesters can comprise from 5 to 95 mole %; or from 5 to 85 mole %; or from 5 to 40 or from 15 to 85 mole %; or from 35 to 85 mole %; or from 55 to 85 mole % of 1,6-hexanediol residues.

In one embodiment of the invention, there are provided compositions wherein the polyesters can comprise from 0 to 85 mole % 1,6-hexanediol residues, and/or from 0 to 85 mole % of 1,4-cyclohexanedimethanol residues.

In one embodiment of the invention, there are provided compositions wherein the polyesters can comprise residues of 1,6-hexanediol and 1,4-cyclohexanedimethanol.

In one embodiment of the invention, there are provided compositions wherein the polyesters can comprise from 5 to 40 mole % 1,6-hexanediol residues and from 40 to 75 mole % of 1,4-cyclohexanedimethanol residues.

In one embodiment of the invention, the diol can be 2,2,4,4-tetraalkylcyclobutane-1,3-diol (TACD). Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol. In one embodiment, the TACD can be TMCD.

In one embodiment of the invention, there are provided compositions wherein the polyesters can comprise residues of 2,2,4,4-tetramethyl-1,3-cyclobutanediol in the amount of 20 to 50 mole %; or 20 to 40 mole %; or 20 to 35 mole %; or 20 to 30 mole %; or 30 to 50; or 25 to 50 mole %; or 25 to 45 mole %; or 25 to 40 mole %; or 25 to 35 mole %; or 30 to 50 mole %; or 30 to 45 mole %; or 35 to 45 mole %.

In one embodiment of the invention, there are provided compositions wherein the polyester does not comprise 2-methyl-1,3-propanediol residues.

The carboxyl compound can be a polycarboxylic acid compound, a derivative of polycarboxylic acid compound, or a combination thereof. Suitable polycarboxylic acid compounds can include compounds having at least two carboxylic acid groups. In one embodiment, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another embodiment, the polycarboxylic acid compound comprises a tricarboxylic acid or anhydride, for example, trimellitic acid or trimellitic anhydride.

Examples of dicarboxylic acids that can be used include but are not limited to aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itaconic acid, tetrahydrophthalic anhydride, tetrahydrophthalic acid, hexahydrophthalic acid or anhydride, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In one embodiment of the invention, there are provided compositions wherein the polyesters can comprise at least one carboxyl component selected from the group consisting of adipic acid, isophthalic acid (or dimethyl isophthalate), terephthalic acid, dimethyl terephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In one embodiment of the invention, there are provided compositions wherein the polyesters can comprise at least one carboxyl component selected from the group consisting of adipic acid and isophthalic acid, or combinations thereof.

In one embodiment of the invention, there are provided compositions wherein the polyesters can comprise at least one carboxylic acid component further comprising from 0 mole % to 100 mole % adipic acid and from 0 mole % to 100 mole % isophthalic acid; or from 50 mole % to 100 mole % adipic acid and from 0 mole % to 50 mole % isophthalic acid; based on the total mole % of the carboxylic acid component equaling 100 mole %.

In one embodiment of the invention, there are provided compositions wherein the polyesters can comprise (a) a dicarboxylic acid component comprising 50 to 100 mole % adipic acid, 0 to 50 mole % isophthalic acid; and (b) at least one polyol comprising residues of 5 to 40, or 10 to 40, or 10 to 30 mole % of 1,1,1-trimethylolpropane, pentaerythritol or combinations thereof, (c) the diol component comprises residues of 0 to 90 mole % 2-methyl-1,3-propanediol, and 0 to 50 mole % neopentyl glycol, (d) optionally, 1,6-hexanediol, and (e) optionally, 1,4-cyclohexanedimethanol; based on the total mole % of the dicarboxylic acid component equaling 100 mole % and the total mole % of the polyol and diol components equaling 100 mole %.

In one embodiment of the invention, there are provided compositions wherein the polyesters can comprise (a) a dicarboxylic acid component comprising 50 to 100 mole % adipic acid and 0 to 50 mole % isophthalic acid; and (b) at least one polyol comprising residues of 5 to 40 mole %, 10 to 40 mole %, or 10 to 30 mole % 1,1,1-trimethylolpropane, pentaerythritol or combinations thereof, (c) the diol component comprises residues of from 0 to 90 mole % 2-methyl-1,3-propanediol, and from 0 to 50 mole % neopentyl glycol, (d) from 5 to 85; or from 5 to 40; or from 15 to 85; or from 35 to 85; or from 55 to 85 mole % 1,6-hexanediol, and/or (e) from 15 to 85; or from 20 to 80; or from 35 to 80; or from 40 to 75; or from 60 to 85; or from 65 to 80; or from 60 to 75 mole % of 1,4-cyclohexanedimethanol.

In one embodiment of the invention, there are provided compositions wherein either or both of Components (I) and (II) comprise at least one aromatic group. For example, the diacid of the polyester can comprise either isophthalic acid or terephthalic acid and/or the aldehyde can be terephthalaldehyde.

In one embodiment of the invention, there are provided compositions wherein diol component (a)(i) of the polyester contains only oxygen, carbon, and hydrogen.

In one embodiment of the invention, there are provided compositions wherein diol component (a)(i) of the polyester does not have any carbonyl groups (—CO—).

In one embodiment of the invention, there are provided compositions wherein diol component (a)(i) of the polyester does not contain ether groups.

In one embodiment of the invention, there are provided compositions comprising at least one polyether functionalized with acetoacetate groups, a polyester functionalized with acetoacetate groups, or combinations thereof.

In one embodiment of the invention, there are provided compositions wherein the polyether can be selected from at least one poly(alkylene glycol).

In one embodiment of the invention, there are provided compositions wherein at least one poly(alkylene glycol) can be selected from at least one of unsubstituted poly(alkylene glycol)s having alkylene chains of 1 to 4 carbon atoms, substituted or unsubstituted poly(alkylene glycol)s having alkylene chains of at least 4 carbon atoms or less than 10 carbon atoms.

In one embodiment of the invention, there are provided compositions wherein the poly(alkylene glycol)s can be selected from poly(ethylene glycol), poly(propylene glycol), poly(tetramethylene glycol), poly(pentamethylene glycol), poly(hexamethylene glycol), poly(heptamethylene glycol), or poly(octamethylene glycol).

In one embodiment of the invention, there are provided compositions wherein the poly(alkylene glycol)s can be selected from poly(ethylene glycol), poly(propylene glycol) and poly(tetramethylene glycol).

Almost any number of repeating units may be used, however, in one embodiment, the poly(alkylene glycol)s can have number average molecular weights in the range of about 500 to 5,000. Suitable poly(alkylene glycols) can have a variety of suitable end groups, including but not limited to hydroxyl, epoxy, methyl, and the like. Preferred end groups can be methyl and hydroxyl.

In one embodiment of the invention, there are provided compositions wherein the at least one polyether can be branched. For example, glycerol or sucrose may be included to increase branching, such as in propoxylated glycerol and propoxylated sucrose.

In one embodiment of the invention, there are provided compositions wherein the branching agents can be 1,1,1-trimethylolpropane, 1,1,1-trimethylolethane, glycerin, sorbitol, pentaerythritol, triisocyanates, sucrose, and/or aliphatic or aromatic glycols, or mixtures thereof.

The amount of polyether useful in the invention can vary as long as it can be formed into the desired article.

In one embodiment of the invention, there are provided compositions wherein Component (I) contains from 100% or less, or 0.01 to 100%, or 0.01 to 80%, or 0.01 to 65%, or 0.01 to 25%, or 20 to 100%, or 20 to 80%, or 20 to 65%, or 5 to 25%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80%, by weight of acetoacetylated polyether, based on the total weight percentage of Component (I) equaling 100 weight %. The remaining weight percentages can be any polymer or copolymer, for example, polyesters, polyurethanes, or polycarbonates (acetoacetylated or not).

In one embodiment of the invention, there are provided compositions wherein the polyethers comprise at least one polyalkylene oxide.

In one embodiment of the invention, there are provided compositions wherein at least one polyalkylene oxide can be selected from linear poly(ethylene oxide), linear poly(propylene oxide), linear copolymers of poly(ethylene oxide) and poly(propylene oxide), linear poly(1,3-trimethylene oxide), and linear poly(1,4-tetramethylene oxide).

In one embodiment of the invention, there are provided compositions comprising poly(alkylene glycol) copolymers. The copolymers may be alternating, random, segmented, block, graft, or branched.

In one embodiment of the invention, there are provided compositions wherein the polyether can be selected from poly(ethylene glycol)-ran-poly(propylene glycol), poly(ethylene glycol)-block-poly(propylene glycol)-block-poly(ethylene glycol) and poly(propylene glycol)-block-poly(ethylene glycol)-block-poly(propylene glycol).

In one embodiment of the invention, there are provided compositions wherein the polyether is a block copolymer where a poly(propylene glycol) is first initiated with a polyhydric alcohol and is then endcapped with ethylene oxide.

The polyether condensation product may be prepared using methods known in the art. For example, a polyether condensation product may be formed by reacting polyethylene glycol with tetramethyl cyclopentane-1,2,3,4-tetracarboxylate. This is a general method that may be used to prepare other polyether condensation products useful in the invention.

The condensation product of the polyethers can be produced by reacting at least one core molecule having more than one carboxylic acid group with a sufficient amount of at least one polyether terminated with hydroxy groups to produce an esterified polyether with an average of more than two hydroxy end groups. Suitable core molecules include, but are not limited to oxalic acid, malonic acid, succinic acid, glutaric acid, adipic acid, tetrahydrophthalic anhydride, tetrahydrophthalic acid, hexahydrophthalic acid or anhydride, benzenedicarboxylic acid, benzenetricarboxylic acid, benzenetetracarboxylic acid, cyclohexanetricarboxylic acid, cyclopentanetetracarboxylic acid, adamantanetetracarboxylic acid, biphenyltetracarboxylic acid, benzophenonetetracarboxylic acid, propanetricarboxylic acid, butanetetracarboxylic acid, and mixtures thereof.

In addition to poly(alkylene glycol)s, polyethers comprising polymeric ethers derived from cyclic ether monomers can be used. For example, poly(2,3-dihydrofurandiyl), prepared by cationic polymerization of 2,3-dihydrofuran, can be incorporated into an oxygen scavenging composition in the same fashion as the above-mentioned poly(alkylene glycol)s.

In one embodiment of the invention, there are provided compositions comprising blends of at least one acetoacetylated polyether resin and/or at least one acetoacetylated polyester resin(s) and optionally, other polymers.

In one embodiment of the invention, there are provided compositions comprising from 100% or less, or 0.01 to 100%, or 0.01 to 80%, or 0.01 to 65%, or 0.01 to 25%, or 20 to 100%, or 20 to 80%, or 20 to 65%, or 5 to 25%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80% by weight of acetoacetylated polyesters of the invention wherein the remaining weight percentages of the resin in Component (I) can be any polymer or copolymer, for example, polyethers, polyurethanes, or polycarbonates, (acetoacetylated or not), based on the total weight percentage of Component (I) equaling 100 weight %.

In one embodiment of the invention, there are provided compositions wherein the alkyl acetoacetate of Component (I) of the invention can be selected from acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

The hydroxyl number of the hydroxyl functional resin used to make the curable acetoacetate functional polyester resins of Component (I) can be within a range of from 0 to 300 mg KOH/g. Suitable ranges of hydroxyl number can include from 0 to 300, or from 100 to 300, or from 120 to 300, or from 120 to 200, or from 140 to 200, or from 150 to 170 mg KOH/g.

In one embodiment, the hydroxyl number of the hydroxyl functional resin used to make Component (I) or compositions of the invention can be at least 5, or at least 30, or at least 50, or at least 80, or from 30 to 200; or from 50 to 150 mg KOH/g.

In one embodiment of the invention, there are provided compositions wherein the acid number of Component (I) or the compositions of the invention can be from 0 to about 14, or from 0 to about 13, or from 0 to about 12, or from 0 to about 11, or from 0 to about 10, or from 0 to about 9, or from 0 to about 8, or from 0 to about 7, or from 0 to about 6, or from 0 to about 5 or from 0 to about 4, or from 0 to about 3, or from 0 to about 2, or from 0 to about 1, or from 0.01 to about 15, or from 0.01 to about 14, or from 0.01 to about 13, or from 0.01 to about 12, or from 0.01 to about 11, or from 0.01 to about 10, or from 0.01 to about 9, or from 0.01 to about 8, or from 0.01 to about 7, or from 0.01 to about 6, or from 0.01 to 5 or from 0.01 to about 4, or from 0.01 to about 3, or from 0.01 to about 2, or from 0.01 to about 1.5, or from 0.01 to about 1, or from 0.50 to about 15, or from 0.50 to about 14, or from 0.50 to about 13, or from 0.50 to about 12, or from 0.50 to about 11, or from 0.50 to about 10, or from 0.50 to about 9, or from 0.50 to about 8, or from 0.50 to about 7, or from 0.50 to about 6, or from 0.50 to 5 or from 0.50 to about 4, or from 0.50 to about 3, or from 0.50 to about 2, or from 0.50 to about 1.5, or from 0.25 to about 1.25 mg KOH/g, with or without addition of neutralizing agents. In one embodiment, the acid number can be from 0.01 to about 2, or from 0.01 to about 1.5 mg KOH/g, without addition of neutralizing agents.

In one embodiment, Component (I) or compositions of the invention can have an acid number of 0 to 20, 0 to 15, or 0 to 10, or less than 10, or 0 to 5, or less than 5, or less than 2, or less than 1.5 mg KOH/g, with and/or without neutralizing agents being added to the composition.

In one embodiment of the invention, there are provided compositions wherein the polyester has an acid number of less than about 10 mg KOH/g as measured according to ASTM Method D7253-16.

The acid number as referred to herein was measured by using a procedure based on ASTM D7253-16 entitled "Standard Test Method for Polyurethane Raw Materials: Determination of Acidity as Acid Number for Polyether Polyols," and hydroxyl number was measured using a procedure based on ASTM E222-17 entitled "Standard Test Methods for Hydroxyl Groups Using Acetic Anhydride."

In one embodiment of the invention, there are provided compositions wherein Component (I), e.g., acetoacetate functional polyester, acetoacetate functional polyether, or blends thereof can have a glass transition temperature (Tg) of about −85° C. to about 150° C.; or about −85° C. to about 130° C.; or about −85° C. to about 120° C.; or about −85° C. to about 110° C.; or about −85° C. to about 100° C.; or about −85° C. to about 80° C.; or about −85° C. to about 70° C.; or about −85° C. to about 60° C.; or about −85° C. to about 50° C.; or about −85° C. to about 40° C.; or about −85° C. to about 30° C.; or about −85° C. to about 20° C.; or about −85° C. to about 10° C.; or about −85° C. to about 0° C.; or about −85° C. to about −10° C.; or about −85° to about −20°; or about −85° C. to about −25°; or about −85° C. to about 30° C.; or about −85° to about 60°; or about −85° C. to about 50° C.; or about −85° C. to about 40°; or about −85° C. to about 30° C.; or about −85° C. to about 20° C.; or about −85° C. to about 10° C.; or about −85° C. to about 0° C.; or about −85° C. to about −10° C.; or about −85° C. to about −20° C.; or about −85° C. to about −25° C.; or about −85° C. to about −30° C.; or about −70° C. to about 60° C.; or about −70° C. to about 50° C.; or about −70° C. to about 40° C.; or about −70° C. to about 30° C.; or about −70° C. to about 20° C.; or about −70° C. to about 10° C.; or about −70° C. to about −5° C.; or about −70° C. to about 0° C.; or about −70° C. to about −10° C.; or about −70° C. to about −20° C.; or about −70° C. to about −25° C.; or about −70° C. to about −30° C.; or about −65° C. to about 60° C.; or about −65° C. to about 50° C.; or about −65° C. to about 40°; or about −65° C. to about 30°; or about −65° C. to about 25° C.; or about −65° to about 20° C. or about −65° to about 10° C.; or about −65° C. to about 0° C.; or about −65° C. to about −10° C.; or about −65° C. to about −20° C.; or about −65° C. to about −25° C.; or about −65° C. to about −30° C.; or about −45° C. to about 60° C.; or about −45° C. to about 50° C.; or about −45° C. to about 40° C.; or about −45° C. to about 30° C.; or about −45° C. to about 25° C.; or about −45° C. to about 20° C. or about −45° C. to about 10° C.; or about −45° C. to about 0° C.; or about −45° C. to about −10° C.; or about −45° C. to about −20° C.; or about −45° C. to about −25° C.; or about −45° C. to about −30° C. As used herein, "Tg" and/or "melting point" is determined using a Q2000 differential scanning calorimeter (DSC) from TA Instruments, New Castle, Del., US, at a scan rate of 20° C./min.

In one embodiment of the invention, there are provided compositions wherein Component (I) can have a Tg of from about −85° C. to about −10° C.; or about −70° C. to about 50° C.; or about −70° C. to about 20° C.; or about −70° C. to about −10° C.; or about −70° C. to about −20° C.; or from about −65° C. to about 40° C.; or from about −65° C. to about 25° C.; or from about −65° C. to about −20° C.; or from about −65° C. to about −25° C.; or from about −10° C. to about 50° C.; or from about −45° C. to about −10° C.; or from about −45° C. to about −25° C.; or from about −10° C. to about 50° C.; or from about −45° C. to about −10° C.; or from about −45° C. to about −25° C.

In one embodiment of the invention, there are provided compositions wherein Component (I) can have a Tg of from about −70° C. to about 50° C.; or from about −70° C. to about 20° C.; or from about −70° C. to about −10° C.; or from about −45° C. to about −10° C.; or from about −70° C. to about −20° C.; or from about −60° C. to about −25° C. Depending on the applications, the uncured polyesters, polyethers and/or polyester/polyester blends can have high or low Tg's.

In one embodiment of this invention, there are provided compositions wherein Component (I) can have a melting point from about 10 to about 150° C., or from about 10 to 100° C., or from about 10 to 80° C., or from about 10 to 75° C., or from about 10 to 60° C., or from 15 to about 15° C., or from about 15 to 100° C., or from about 15 to 80° C., or from about 15 to 75° C., or from about 25 to 60° C., or from 25 to about 150° C., or from 25 to about 100° C., or from 25 to about 80° C., or from about 25 to 75° C., or from about 25 to 60° C.

The number average molecular weight (Mn) of Component (I) useful in the present invention can be from 500 to 100,000; or from 700 to 50,000; or from 700 to 40,000; or from 700 to 30,000; or from 700 to 25,000; or from 700 to 20,000; or from 700 to 15,000; or from 700 to 10,000; or from 700 to 9,000; or from 700 to 8,000; or from 700 to 7,000; or from 1000 to 6,000; or from 700 to 5,000; or from 700 to 4,000; or from 700 to 3500; or from 1,000 to 50,000; or from 1,000 to 40,000; or from 1,000 to 30,000; or from 1,000 to 25,000; or from 1,000 to 20,000; or from 1000 to 15,000; or from 1000 to 10,000; or from 1000 to 9,000; or from 1000 to 8,000; or from 1000 to 7,000; or from 1000 to 6,000; or from 1000 to 5,000; or from 1000 to 4,000; or from 1200 to 3500; or from 1500-4000; or from 1500 to 3500; or from 1500 to 3000; or from 1500 to 2500; or from 1400 to 3000; or from 1400 to 2500; or from 500-6000 g/mol.

In one embodiment of the invention, there are provided compositions wherein Component (I) can have a number average molecular weight (Mn) from 1000-6000 g/mol; or 1000-5000 g/mol; or 1500-4000 g/mol; or 1400-3000 g/mol; or 1400-2500 g/mol; or 1500 to 3500 g/mol; or 1500 to 3000 g/mol; or 1500 to 2500 g/mol; or 500-6000 g/mol; or 1000-6000 g/mol. The polyester can be linear or branched. The polyester can be amorphous or semi-crystalline. The Mn is measured by gel permeation chromatography (GPC) using polystyrene equivalent molecular weight.

In this invention, viscosity can be reported as Brookfield viscosity or complex viscosity. Brookfield viscosity can be measured using a Brookfield viscometer as described in ASTM D3236 "Apparent Viscosity of Hot Melt Adhesives and Coating Materials." Complex viscosity can be measured by a Discovery Hybrid Rheometer (DHR). In one embodiment of the invention, for example, for solventless compositions, complex viscosity can be measured in centipoise (cP) at or above 25° C. by a Discovery Hybrid Rheometer 3 (DHR), T.A. Instruments.

For cured or uncured compositions, Brookfield and/or complex viscosity measurements can be reported in centipoise (cP) units. In various embodiments, Component (I) of the invention and/or the curable (pre-cured) compositions of the invention, for example, adhesive compositions, can exhibit a Brookfield viscosity or a complex viscosity in the range of 5 to 700,000 cP, or 5 to 300,000 cP, or 300 to 200,000 cP, or 300 to 150,000 cP, or 300 to 100,000 cP, or 500 to 200,000 cP, or 500 to 150,000 cP, or 500 to 100,000 cP, or 500 to 90,000 cP, or 500 to 80,000 cP, or 500 to 50,000 cP, or 500 to 45,000 cP, or 500 to 40,000 cP, or 500 to 35,000 cP, or less than 30,000 cP, or 500 to 30,000 cP, or 500 to 25,000 cP, or 500 to 20,000 cP, or 500 to 15,000 cP, or 500 to 10,000 cP, or 500 to less than 10,000 cP, or 500 to 8,000 cP or 500 to 5,000 cP, or 500 to 3,000 cP, or 1000 to 100,000 cP, or 1000 to 90,000 cP, or 1000 to 80,000 cP, or 1000 to 50,000 cP, or 1000 to 45,000 cP, or 1000 to 40,000 cP, or 1000 to 35,000 cP, or 1000 to 30,000 cP, or 1000 to 25,000 cP, or 1000 to 20,000 cP, or 1000 to 15,000 cP, or 1000 to 10,000 cP, or 1000 to less than 10,000 cP, or 1000 to 8,000 cP or 1000 to 5,000 cP, or 1000 to 3,000, or 5000 to 90,000 cP, or 5000 to 80,000 cP, or 5000 to 50,000 cP, or 5000 to 45,000 cP, or 5000 to 40,000 cP, or 5000 to 35,000 cP, or 5000 to 30,000 cP, or 5000 to 25,000 cP, or 5000 to 20,000 cP, or 5000 to 15,000 cP, or 5000 to 10,000 cP, or 5000 to less than 10,000 cP, or 5000 to 8,000 cP, or 10,000 to 90,000 cP, or 10,000 to 80,000 cP, or 10,000 to 50,000 cP, or 10,000 to 45,000 cP, or 10,000 to 40,000 cP, or 10,000 to 35,000 cP, or 15,000 to 90,000 cP, or 15,000 to 80,000 cP, or 15,000 to 50,000 cP, or 15,000 to 45,000 cP, or 15,000 to 40,000 cP, or 15,000 to 35,000 cP, or 20,000 to 90,000 cP, or 20,000 to 80,000 cP, or 20,000 to 50,000 cP, or 20,000 to 45,000 cP, or 20,000 to 40,000 cP, or 20,000 to 35,000 cP, or 25,000 to 90,000 cP, or 25,000 to 80,000 cP, or 25,000 to 50,000 cP, or 25,000 to 45,000 cP, or 25,000 to 40,000 cP, or 25,000 to 35,000, or 30,000 to 90,000 cP, or 30,000 to 80,000 cP, or 30,000 to 50,000 cP, or 30,000 to 45,000 cP, or 30,000 to 40,000 cP, or 35,000 to 90,000 cP, or 35,000 to 80,000 cP, or 35,000 to 50,000 cP, or 35,000 to 45,000 cP, or 35,000 to 40,000 cP, at application temperature, or at room temperature, or at 50° C. or less, or at 45° C. or less, or at 40° C. or less. The desired viscosity of the final composition will depend upon the application and can be adjusted for the application.

In one embodiment of the invention, there are provided compositions wherein the Brookfield viscosity (or the complex viscosity) of Component (I) or any of the compositions of the invention is less than 700,000 centipoise, or less than 300,000 centipoise, or from 500 to 300,000 centipoise, or less than 100,000 centipoise, or less than 80,000 centipoise, or less than 30,000 centipoise, or less than 20,000 centipoise, or less than 10,000 centipoise, or less than 5,000 centipoise, or from 500 to 30,000 centipoise, or from 4500 centipoise or less, or from 2500 centipoise or less, or from 2000 centipoise or less, or 1000 centipoise or less, at application temperature, or at room temperature, or at 50° C. or less, or at 45° C. or less, or at 40° C. or less.

In one embodiment of the invention, there are provided compositions wherein the Brookfield viscosity (or the complex viscosity) of Component (I) or the compositions of the invention is less than 300,000 centipoise, or from 500 to 300,000 centipoise, or less than 30,000 centipoise, or from 500 to 30,000 centipoise, at application temperature, or at room temperature, or at 50° C. or less, or at 45° C. or less, or at 40° C. or less.

In one embodiment of the invention, there are provided compositions wherein the Brookfield viscosity (or the complex viscosity) of Component (I) or the curable compositions of the invention is from 500 cP or less, or 100 cP or less, or 50 cP or less, or from 1 to 100 cP, or from 1 to 50 cP, or from 10 to 50 cP, at application temperature, or at room temperature, or at 50° C. or less, or at 45° C. or less, or at 40° C. or less.

In one embodiment of the invention, there is provided a curable composition, e.g., solventless compositions, wherein the Brookfield viscosity (or the complex viscosity) of Component (I) or any of the compositions of the invention is from 5 to 5,000 cP, or 5000 cP or less, or 4500 cP or less, or 2500 cP or less, or 2000 cP or less, or 1500 cP or less, or 1000 cP or less, at application temperature, or at room temperature, or at 50° C. or less, or at 45° C. or less, or at 40° C. or less.

In another embodiment of this invention, any polyesters, any polyester polyols, and/or any polyethers as described herein are separately included within the scope of the invention and do not require combination with Components (II) and/or (III) of the curable compositions of the invention.

In other embodiments, the curable adhesive compositions may exhibit a ring and ball softening point in the range of −10 to 180° C.

In one embodiment of the invention, there are provided compositions comprising an adduct having two or more R-ketoacetate functional groups selected from 2-methyl-1, 3-propanediol diacetoacetate; neopentyl glycol diacetoacetate; 2,2,4,4-tetramethylcyclobutane-1,3-diol diacetoacetate; or trimethylolpropane triacetoacetate. These adducts can function as reactive diluents to reduce the viscosity of the curable formulations, especially those of solventless formulations for extending their pot life and/or for modifying the functionality of the β-ketoester functional groups available for curing agents.

In one embodiment of the invention, there are provided compositions comprising an adduct having two or more 1-ketoacetate functional groups selected from 2-methyl-1, 3-propanediol diacetoacetate, 2,2,4,4-tetramethylcyclobutane-1,3-diol diacetoacetate; neopentyl glycol diacetoacetate, and trimethylolpropane triacetoacetate.

In one embodiment of the invention, there are provided compositions wherein at least one basic catalyst or activating agent can be selected from the group consisting of primary and/or secondary amines (primary amines are defined herein as comprising primary amine functionality and secondary amines are defined herein as comprising secondary amine functionality), salts thereof and/or mixtures thereof, including but not limited to aliphatic, cycloaliphatic, aliphatic-aromatic, and/or aromatic amines. For example, in one embodiment, the definition of a primary amine does not exclude an amine having both primary amine functionality and tertiary amine functionality. Salts of the amines can include but are not limited to their carboxylate, phosphate, sulfate, and/or hydrochloride salts. The salt of the amine can be prepared by any method known in the art or by the following methods: (1) in situ by addition of the corresponding acid and amine and/or (2) preparation separately by pre-reacting amine and acid and adding as a single component as a catalyst to the curable composition.

In one embodiment of the invention, there are provided compositions wherein said at least one amine can be selected from C1-C20 aliphatic amines, C1-C20 cycloaliphatic amines, or combinations thereof.

In one embodiment of the invention, there are provided compositions wherein at least one amine comprises at least one primary and/or secondary functionality, including but not limited to at least one of: piperidine; piperazine; morpholine, pyrrolidine; ethylenediamine; diethylenetriamine; triethylenetetramine (TETA) or isomers thereof; tetraethylenepentamine or isomers thereof; 2,4,4-trimethylhexamethylenediamine; 1,2-diaminopropane; 1,3-diaminopropane; 1-ethyl-1,3-propanediamine; 2,2-dimethylpropylenediamine; 1,4-diaminobutane; 2-methylpentamethylenediamine (MPMDA, trade name Dytek™ A); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3-dimethylaminopropylamine (DMAPA); 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediamine; 4,4'-diaminodicyclohexylmethane; 4,4'-diaminodicyclohexylethane; 4,4'-diaminodicyclohexylpropane; 2,2-bis(4-aminocyclohexyl) propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine; 1,2,4-triazole; alanine; proline; 1,4,8,11-tetraazacyclotetradecane (cyclam); diphenylethylenediamine; 2,2,4, 4-tetramethylcyclobutane-1,3-diamine; 2,2-dimethylpropane-1,3-diamine; 2,3-dimethylbutane-2,3-diamine; 1,2-diaminocyclopentane; 1,2,2-trimethylcyclopentane-1,3-diamine; 1,7,7-trimethylbicyclo [2.2.1]heptane-2,3-diamine; dioctyl amine; diisopropylamine; and/or polyetheramines such as JEFFAMINE® D-230, D-400, D-2000, and T-403 amines.

In one embodiment of the invention, there are provided compositions wherein the amine comprises primary amine functionality and can be selected from at least one of: ethylenediamine; diethylenetriamine; triethylenetetramine (TETA) or isomers thereof; tetraethylenepentamine or isomers thereof; 3-dimethylaminopropylamine; 3-diethylaminopropylamine; 2,2,4-trimethylhexamethylenediamine; 1,2-diaminopropane; 1,3-diaminopropane; 2,2-dimethylpropylenediamine; 1,4-diaminobutane; 2-methylpentamethylenediamine (trade name Dytek™ A); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediamine; 4,4'-diaminodicyclohexylmethane; 4,4'-diaminodicyclohexylethane; 4,4'- diaminodicyclohexylpropane; 2,2-bis(4-aminocyclohexyl) propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine, or combinations thereof.

In one embodiment, the amines of the invention having primary amine functionality can comprise aminosilanes including but not limited to the following: 3-(dimethoxymethylsilyl)propylamine; 4-amino-3,3-dimethylbutyl trimethoxysilane; 4-amino-3,3-dimethylbutylmethyl dimethoxysilane; 3-aminopropylmethyl diethoxysilane; N-(2-aminoethyl)-3-aminopropyl trimethoxysilane; N-(2-aminoethyl)-3-aminopropyl triethoxysilane; (3-trimethoxysilylpropyl)diethylenetriamine; 3-(1,3-dimethylbutylidene)aminopropyltriethoxysilane; 3-(2-aminoethylamino)propyldimethoxymethylsilane; 3-(2,8,9-trioxa-5-aza-1-sila-bicyclo[3.3.3]undec-1-yl)-propylamine; trimethoxysilylpropylamine; and triethoxysilylpropylamine.

In one embodiment of the invention, amines having primary amine functionality can comprise any specifically listed herein or any combination(s) thereof.

In one embodiment of the invention, there are provided compositions wherein at least one amine can be selected from the group consisting of triethylenetetramine (TETA) including isomers thereof, 3-dimethylaminopropyl amine, 2-methylpentamethylenediamine, hexamethylene diamine (HMDA), piperidine, piperazine, 1,4,8,11-tetraazacyclotetradecane, pyrrolidine, or combinations thereof.

In one embodiment of the invention, there are provided compositions wherein at least one amine can be selected from the group consisting of triethylenetetramine (TETA) or isomers thereof, 3-dimethylaminopropyl amine, 2-methylpentamethylenediamine, hexamethylene diamine (HMDA), or combinations thereof.

In one embodiment of the invention, there are provided compositions wherein at least one amine has secondary amine functionality.

In one embodiment of the invention, there are provided compositions wherein at least one amine can be selected from the group consisting of piperidine, piperazine, triethylenetetramine (TETA) or isomers thereof, 2-methylpentamethylenediamine, hexamethylene diamine (HMDA) or combinations thereof.

In one embodiment of the invention, there are provided compositions wherein said at least one amine can be selected from sterically hindered C1-C20 dialkyl amines, such as diisopropylamine.

In one embodiment of the invention, there are provided compositions wherein said at least one amine can be selected from C1-C20 dialkyl amines such as diisopropylamine and dioctylamine.

In one embodiment of the invention, there are provided compositions wherein monoethylamine and/or amines having only tertiary amine functionality, i.e., no primary or secondary amine functionality, are excluded.

In one embodiment of the invention, there are provided compositions wherein amines having any tertiary amine functionality and/or monoethylamine are excluded.

In one embodiment of the invention, there are provided compositions comprising tertiary amines which can be selected from at least one of 1,8-diazabicyclo-[5.4.0]undec-7-ene, 1,5-diazabicyclo[4.3.0]non-5-ene, 1,5,7-triazabicyclo[4.4.0]dec-5-ene, 7-methyl-1,5,7-triazabicyclo[4.4.0]dec-5-ene, and 1,1,3,3-tetramethylguanidine, 1,4-diazabicyclo[2.2.2]octane, triethylamine and N,N-dimethylethanolamine, or combinations thereof. "Tertiary amines" as can be included within the scope of this invention comprises amines or compounds having tertiary amine functionality.

In one embodiment of the invention, there are provided compositions wherein the amine is a solid or a liquid.

In one embodiment of the invention, there are provided compositions wherein at least one amine and/or any reaction product thereof is present in the amount of up to 25 parts per hundred (phr) based on the total weight of Component (I), the resin.

The compositions of the present invention can comprise one or more base catalysts of Component (III) selected from at least one amine, including but not limited to amines having primary and/or secondary amine functionality, salts thereof and/or mixtures thereof, in an amount ranging from 0.10 to 10, 0.10 to 9.0, 0.10 to 8.0, 0.10 to 7.0, 0.10 to 6.0, 0.10 to 5.0, 0.10 to 4.0, 0.10 to 3.0, 0.10 to 2.0, 0.10 to 1.0, 0.20 to 10, 0.20 to 9.0, 0.20 to 8.0, 0.20 to 7.0, 0.20 to 6.0, 0.20 to 5.0, 0.20 to 4.0, 0.20 to 3.0, 0.20 to 2.0, 0.20 to 1.0, 0.30 to 10, 0.30 to 9.0, 0.30 to 8.0, 0.30 to 7.0, 0.30 to 6.0, 0.30 to 5.0, 0.30 to 4.0, 0.30 to 3.0, 0.30 to 2.0, 0.30 to 1.0, 0.40 to 10, 0.40 to 9.0, 0.40 to 8.0, 0.40 to 7.0, 0.40 to 6.0, 0.40 to 5.0, 0.40 to 4.0, 0.40 to 3.0, 0.40 to 2.0, 0.40 to 1.0, 0.50 to 10, 0.50 to 9.0, 0.50 to 8.0, 0.50 to 7.0, 0.50 to 6.0, 0.50 to 5.0, 0.50 to 4.0, 0.50 to 3.0, 0.50 to 2.0, 0.50 to 1.0, 1.0 to 10, 1.0 to 9.0, 1.0 to 8.0, 1.0 to 7.0, 1.0 to 6.0, 1.0 to 5.0, 1.0 to 4.0, 1.0 to 3.0, or 1.0 to 2.0 phr, based on the total weight of Component (I), the resin.

In one embodiment of this invention, there are provided compositions comprising one or more base catalysts selected from at least one amine, including but not limited to primary and/or secondary amines, salts thereof and/or mixtures thereof, in an amount ranging from 0.1 to 15 phr, or 0.1 to 10 phr, or from 0.10 to 3 phr, or 0.5 to 10 phr, or 0.5 to 10 phr, or 0.5 to 10 phr, or 0.1 to 10 phr, or 0.1 to 3 phr, or 0.1 to 1.5 phr, or 3 to 10 phr, or 1 to 9 phr, or 0.2 to 7 phr, or 0.3 to 6 phr, or 0.5 to 5 phr, or 0.5 to 3 phr, or 0.5 to 2 phr, or 1 to 10 phr, or 1 to 3 phr, or 1 to 2 phr, or 1 to 1.5 phr or 0.5 to 1.5 phr, based on the total weight of Component (I), the resin.

In one embodiment of this invention, there are provided compositions wherein the amine and/or reaction product thereof is present in an amount ranging from 0.5 to 10 phr, 3 to 10 phr, 1 to 9 phr, 0.5 to 5 phr, or 1 to 1.5 phr based on the total weight of Component (I), the resin, and depending on the application.

In one embodiment of this invention, there are provided compositions wherein the amine and/or reaction product thereof is present in an amount ranging from 0.5 to 10 phr, or 0.5 to 5 phr, or 0.5 to 4.5 phr based on the total weight of Component (I), the resin.

In one embodiment of this invention, there are provided compositions wherein the amine is present in an amount ranging from 0.5 to 4.5, or 0.5 to 4.0, or 0.5 to 3.5, or 0.5 to 3.0, or 0.5 to 2.5, or 0.5 to 2.0, or 0.5 to 1.5, or 0.5 to 1.0 phr, based on the total weight of Component (I), the resin.

In one embodiment of the invention, there are provided compositions where the curing agent with aldehyde functional groups can be either Component (II), or the product where component (II) has been first combined with either Component (I) or Component (III).

In one embodiment of the invention, there are provided compositions wherein the curing agent comprises an aliphatic, or aromatic, di- or poly-aldehyde or mixtures thereof.

In one embodiment, the curing agent (II) can be a small molecule or an adduct having one or more aldehyde functional groups or two or more aldehyde functional groups.

The aldehydes useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company, Midland, Mich., US; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

In one embodiment of the invention, the aldehyde useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

In one embodiment of the invention, the aldehyde useful in the invention can be selected from at least one of mixtures of 1,3- and 1,4-CHDAL, terephthalaldehyde, orthophthaladehyde, and tricyclodecane dialdehyde, or any isomers thereof or any combinations thereof.

In one embodiment of the invention, there are provided compositions wherein monoaldehydes are excluded from the scope of this invention.

In one embodiment, at least one semi-crystalline polyester resin can be used. In one embodiment, the semi-crystalline polyester resin can possess enough crystalline character to give the material a sharp melting point rather than slowly softening when heated. The semi-crystalline polyester resin can be a solid, a waxy, or a semi-solid material at room temperature with a melting point, for example, from 10 to 100° C., or for example, from 15 to 75° C., or for example, from 25 to 65° C.

The glass transition temperature (Tg) of the semi-crystalline polyesters useful in the invention can be from –70 to 20° C., or from –60 to 0° C., or from –50 to –20° C., or in any subsets of the ranges mentioned herein for the polyesters useful in the invention.

The semi-crystalline polyester resins, like the other polyesters useful herein, can have a number average molecular weight (Mn) from 1000-5000 g/mol, or from 1500-4000 g/mol.

In this invention, "curing" means to develop at least one strength property and/or increase in the average molecular weight (either Mn or Mw) of the composition(s) of the invention, for example, an adhesive composition or a coating composition, by chemical reaction. "Curing agent" means a substance or mixture of substances that reacts with resin during a curing reaction. "Curing temperature" means the temperature to which at least one composition(s) of the invention or an article of manufacture containing at least one composition(s) of the invention is subjected to cure the composition. "Curing time" means the period of time for curing of the composition(s) of the invention to occur, whether or not they cure at room temperature, and whether or not they are subjected to application of thermal energy; radiation, e.g., microwave, ultraviolet, or infrared radiation; ultrasonic waves; pressure; moisture; or other sources of activation; or any other variables. "Curable" means capable of curing.

In one embodiment of the invention, there are provided compositions comprising essentially no solvent or which is solventless (except for where solvents can be added, in some embodiments, to the final composition to adjust the viscosity). By the terms "solventless" or "comprising essentially no solvent", it is meant that solvent could be present in an amount of from 0 to 5 weight % or from 0 to 2 weight %, based on the total weight of the composition.

In one embodiment of the invention, there are provided compositions wherein Components (I)-(III) are mixed or reacted without the presence of solvent.

In one embodiment of the invention, there are provided compositions wherein Components (I)-(III) are mixed or reacted in the presence of solvent.

The curable composition of the invention may be essentially solvent free, solvent-less or solvent-based. In one embodiment, the solvent-based composition of the invention comprises an organic solvent. Suitable organic solvents include ethyl acetate, butyl acetate, xylene, ketones (for example, acetone, methyl amyl ketone and methyl ethyl ketone), 2-butoxyethanol, ethyl-3-ethoxypropionate, toluene, butanol, cyclopentanone, cyclohexanone, ethanol, and other volatile inert solvents typically used in adhesives. In one embodiment, the solvents useful in the invention are ethyl acetate, butyl acetate, xylene, methyl amyl ketone, methyl ethyl ketone, acetone, ethanol, and toluene.

In one embodiment of the invention, there are provided compositions which contains one or more organic solvents selected from the group comprising ethyl acetate, butyl acetate, xylene, methyl amyl ketone, methyl ethyl ketone, ethanol, acetone, methanol and toluene.

In one embodiment of the invention, there are provided compositions wherein at least one solvent can be selected from ethyl acetate, butyl acetate, ethanol and acetone, or combinations thereof.

In one embodiment of the invention, there are provided compositions wherein at least one solvent can be selected from ethyl acetate, butyl acetate, or combinations thereof.

In one embodiment of the invention, there is provided compositions comprising at least one solvent which is not an ether or polyether and/or which does not contain ether groups. In one embodiment of this invention, the curable compositions of this invention do not contain solvents or residual amounts of solvents such as ethylene glycol and/or ether-containing compounds, for example, dimethyl ether, ethylene glycol diethyl ether, diethylene glycol dimethyl ether, or diethylene glycol diethyl ether.

In one embodiment of the invention, there are provided compositions wherein said organic solvents are used to reduce the viscosity of the adhesive composition.

In one embodiment of the invention, there are provided compositions wherein said adducts having two or more 1-ketoester functional groups described herein are used as reactive diluents to reduce the viscosity of the curable compositions and/or to reduce the solvent content.

The amount of solvents (excluding water) can range from 0% to 75%, 5% to 75%, 10% to 75%, 15% to 75%, 20% to 75%, 25% to 75%, 30% to 75%, 35% to 75%, 40% to 70%, 0% to 70%, 5% to 70%, 10% to 70%, 15% to 70%, 20% to 70%, 25% to 70%, 30% to 70%, 35% to 70%, 40% to 70%, 0% to 65%, 5% to 65%, 10% to 65%, 15% to 65%, 20% to 65%, 25% to 65%, 30% to 65%, 35% to 65%, 40% to 65%, 0% to 60%, 5% to 60%, 10% to 60%, 15% to 60%, 20% to 60%, 25% to 60%, 30% to 60%, 35% to 60%, 40% to 60%, 0% to 55%, 5% to 55%, 10% to 55%, 15% to 55%, 20% to 55%, 25% to 55%, 30% to 55%, 35% to 55%, 40% to 55%, 0% to 50%, 5% to 50%, 10% to 50%, 15% to 50%, 20% to 50%, 25% to 50%, 30% to 50%, 35% to 50%, 40% to 50%, 0% to 45%, 5% to 45%, 10% to 45%, 15% to 45%, 20% to 45%, 25% to 45%, 0% to 40%, 5% to 40%, 10% to 40%, 15% to 40%, 20% to 40%, 25% to 40%, or 0% to 5% by weight based on the total weight of the composition equaling 100 weight %.

In one embodiment, the amount of solvents (excluding water) can range from 20 to 65%, or 20 to 55%, or 20 to 50%, or 25 to 45%, or 40 to 60%, or 25 to 55%, or 25 to 60%, by weight based on the total weight of the composition equaling 100 weight %. The percentage by weight of solids (based on the total weight of the composition equaling 100 weight %) is the remainder of the weight % of the composition that does not comprise solvent(s). Therefore, the percentage by weight of solids based on the total weight of the composition equaling 100 weight % would be, for example, 20% to 100%, 20% to 95%, 20% to 90%, 20% to 85%, 20% to 80%, 20% to 75%, 20% to 70%, 25% to 100%, 25% to 98%, 25% to 95%, 25% to 90%, 25% to 85%, 25% to 80%, 25% to 75%, 25% to 70%, 30% to 100%, 30% to 95%, 30% to 90%, 30% to 85%, 30% to 80%, 30% to 75%, 30% to 70%, 35% to 100%, 35% to 95%, 35% to 90%, 35% to 85%, 35% to 80%, 35% to 75%, 35% to 70%, 40% to 100%, 40% to 95%, 40% to 90%, 40% to 85%, 40% to 80%, 40% to 75%, 40% to 70%, 50% to 100%, 50% to 95%, 50% to 90%, 50% to 85%, 50% to 80%, 50% to 75%, 50% to 70%, 50% to 65%, 50% to 60%, 55% to 100%, 55% to 95%, 55% to 90%, 55% to 85%, 55% to 80%, 55% to 75%, 55% to 70%, 55% to 65%, 60% to 100%, 60% to 95%, 60% to 90%, 60% to 85%, 60% to 80%, 60% to 75%, 60% to 70%, 95% to 99.99%, or 98% to 99.99%.

The term "excluding water" means that water is not added as a solvent, but moisture and/or water can be formed during the curing process.

In one embodiment of this invention, the curable composition of the invention can be water-free, and/or moisture-free, and/or can comprise substantially no water, and/or can contain essentially no water, or can contain one of the following percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, 0 to 9 weight %, 0 to 8 weight %, 0 to 7 weight %, 0 to 6 weight %, 0 to 5 weight %, 0 to 4 weight %, 0 to 3 weight %, 0 to 2 weight %, 0 to 1 weight %, 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, 0.01 to 9 weight %, 0.01 to 8 weight %, 0.01 to 7 weight %, 0.01 to 6 weight %, 0.01 to 5 weight %, 0.01 to 4 weight %, 0.01 to 3 weight %, 0.01 to 2 weight %, or 0.01 to 1 weight %, based on the total weight of the composition. The term "substantially water free" means that no more than 0.01 to 2 weight % water could be present prior to the curing reaction.

In one embodiment of the invention, there is provided composition(s) of the invention wherein the solids content is from 25 to 100, or from 25 to 98, or from 25 to 95, or from 35 to 80, or from 35 to 75, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 80, or from 30 to 80, or from 35 to 80, or from 35 to 75, or from 30 to 65, or from 30 to 60, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 100% by weight solids, 25 to 95% by weight solids, or 95% by weight solids or greater, or 100% by weight solids.

In one embodiment of the invention, there is provided composition(s) of the invention wherein the solids content of the composition is from 35 to 75% by weight solids.

In some cases, the composition(s) of the invention can be a liquid composition in water or solvent, applied to a surface and dried or permitted to dry, while, in other embodiments, the composition may be at or near 100 percent solids. In one embodiment of this invention, there are provided curable compositions which, upon curing, can release essentially no Volatile Components, e.g., Volatile Organic Components (VOCs), or has low Volatile Components, e.g., VOCs, released before, during, and/or after curing; or less than 5 weight %, less than 4 weight %, less than 3 weight %, less than 2 weight %, or less than 1 weight % VOCs; based on the total weight of the composition.

In one embodiment of this invention, there are provided curable compositions which, upon curing, can release essentially no gases or no gases.

In one embodiment of the invention, the compositions of the invention can further comprise at least one compound selected from waxes; paraffins; rosins; rosin ester resins; tackifier resins; polyester resins; polyol resins; or acrylics, the acrylics having a number average molecular weight of from about 2,000 to 15,000 and a Tg of from about 40° C. to 130° C.; or mixtures thereof.

In one embodiment of the invention, there are provided compositions that are used at, or above, or near its glass transition temperature.

In one embodiment of the invention, there are provided cured compositions wherein ΔT is the difference between the temperature at use and the glass transition temperature (Tg) of the cured composition, and ΔT is from −30° to 60° C. or from −30° to 10° C.

In one embodiment of the invention, there are provided cured compositions that maintain at least 50%, or at least 80% of 180 degree peel strength after aging at 80° C. for seven days as measured according to ISO 8510-2-2006 Part 2 at 5 mm/sec.

In one embodiment of the invention, there are provided cured compositions having a 180 degree peel strength of at least 8.9 N/25 mm (2 lb/in), or at least 13.3 N/25 mm (3 lb/in), or at least 17.8 N/25 mm (4 lb/in), or at least 22.25 N/25 mm (5 lb/in), according to ISO 8510-2-2006 Part 2 at 5 mm/sec.

In one embodiment of the invention, there are provided cured compositions having a T-peel strength of at least 100 g/in as measured according to ASTM F904-16 "Standard Test Method for Comparison of Bond Strength or Ply Adhesion of Similar Laminates Made from Flexible Materials" when cured for one week at room temperature. In some embodiments, the T-peel strength measured as noted can be at least 100 g/in, or at least 150 g/in, or at least 200 g/in, or at least 250 g/in, or at least 300 g/in, or at least 350 g/in, or at least 400 g/in, or at least 500 g/in.

In one embodiment of the invention, there are provided cured compositions having a T-peel strength of at least 120 g/in as measured according to ASTM F904-16 "Standard Test Method for Comparison of Bond Strength or Ply Adhesion of Similar Laminates Made from Flexible Materials" when aged for eight weeks at room temperature.

In one embodiment of the invention, there are provided cured compositions having a T-peel strength of at least 120 g/in as measured according to ASTM F904-16 "Standard Test Method for Comparison of Bond Strength or Ply Adhesion of Similar Laminates Made from Flexible Materials" when aged for four weeks, or eight weeks, at room temperature.

In one embodiment of the invention, there are provided cured compositions having a T-peel strength of at least 150 g/in as measured according to ASTM F904-16 "Standard Test Method for Comparison of Bond Strength or Ply Adhesion of Similar Laminates Made from Flexible Materials" when aged for three weeks at 40° C.

In one embodiment of the invention, there are provided cured compositions having a T-peel strength loss of less than 20% as measured according to ASTM F904-16 "Standard Test Method for Comparison of Bond Strength or Ply Adhesion of Similar Laminates Made from Flexible Materials" when aged at 40° C. for three weeks, or at 80° C. for one week.

In one embodiment of the invention, there are provided cured compositions having a T-peel strength loss of less than 20% as measured according to ASTM F904-16 "Standard Test Method for Comparison of Bond Strength or Ply Adhesion of Similar Laminates Made from Flexible Materials" for the time period from having been aged for one week to having been aged for four weeks at room temperature.

In one embodiment of the invention, there are provided compositions wherein the peak tensile strength was retained or increased when first aged for one week at room temperature and then at 80° C. for one week. In one embodiment of the invention, there are provided compositions having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when aged for one week at room temperature.

In one embodiment of the invention, there are provided compositions having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when first aged for one week at room temperature and then at 80° C. for one week.

In one embodiment of the invention, there are provided a composition having an elongation at break of from 1 to 560%, or from 1 to 350%, or from 1 to 300%, or from 10 to 400%, or from 10 to 350%, or from 10 to 325%, or from 10 to 300%, or from 25 to 400%, or from 25 to 350%, or from 25 to 325%, or from 25 to 300%, or from 50 to 400%, or from 50 to 350%, or from 50 to 325%, or from 50 to 300%, as measured according to ASTM D638 when aged for one week at room temperature.

In one embodiment of the invention, there are provided compositions having a Young's modulus of from 0.1 to 5000 MPa, or from 0.1 to 4500 MPa, or from 0.1 to 4000 MPa, or from 0.1 to 3500 MPa, or from 0.1 to 3000 MPa, or from 0.1 to 2500 MPa, or from 0.1 to 2000 MPa as measured according to ASTM D638 when aged for one week at room temperature.

In one embodiment of the invention, the compositions of the invention can have one or more of any of the properties described herein, in any combination.

In one embodiment of the invention, there are provided compositions that are capable of curing, curable, have cured, or have reached a gelation point. At the gelation point, a loose network of crosslinks are formed across the material, and the gel or gelation point can be measured as either (1) the point when the storage modulus (G') and the loss modulus (G") crossed, or (2) when the tan delta became independent of frequency, each method by rotational rheometry using a Discovery Hybrid Rheometer 3 (DHR), T.A. Instruments.

As used herein, storage modulus is a measure of elastic response of a material. It measures the stored energy. Loss modulus is a measure of viscous response of a material. It measures the energy dissipated as heat. Tan delta, a measure of damping, is the ratio of loss modulus to the storage modulus, G"/G'. These properties can be used to evaluate compositions for stability at storage and spray conditions, gelation process, and thermal stability.

In one embodiment of the invention, there are provided compositions having a gelation point, or that cures, at or above 25° C. as measured by a Discovery Hybrid Rheometer 3 (DHR), T.A. Instruments.

"Pot life" herein means period of time during which a multi-part composition can be used after mixing the components. "Working life" means the time period that a composition is available to be applied to at least one substrate and to be capable of forming a bond.

Pot life measurements can include various methods such as: (1) the time from the initial viscosity (when components have been all combined) to the time of doubling of viscosity; (2) reaching a particular viscosity value above which the composition can no longer be used in a given application or application method; (3) reaching a viscosity so high that the curable composition can no longer be molded or applied to a substrate, depending on the particular application and its requirements; or (4) for solvent-based compositions, reaching a viscosity of 24 seconds using a #2 Zahn cup following ASTM Method D4212 at room temperature.

In one embodiment of the invention, various factors can influence pot life including, but not limited to, choice of and/or amount of Components (I), (II), and/or (III), choice of solvent and concentration of the formulation in the solvent. Extended pot life can provide the user with more flexibility in efficiently applying the curable composition of the invention. In certain embodiments of the invention, extended pot life of the compositions is provided.

In some embodiments and using any of the pot life measurement methods described herein, the compositions of the invention can have a very adequate pot life ranging from minutes, to hours, to days. In some embodiments and using any of the pot life measurement described herein, the pot life of the compositions of the invention can be 5 minutes or more; or 10 minutes or more; or 25 minutes or more. Independently, in some embodiments, pot life can be 7 days or less; or 1 day or less; or 8 hours or less; or 2 hours or less; or 30 minutes or less.

In one embodiment of the invention, there are provided compositions having a gelation point at or above 25° C. of 2 minutes or greater, or one-half hour or greater, or 1 hour or greater.

In one embodiment of the invention, there are provided compositions wherein Component (I) comprises at least one polyester or polyether, which is semi-crystalline at or below 80° C., or below 65° C., or below 50° C., or below 40° C., or below 35° C., whether or not it is present in a blend with at least one non-crystalline resin and wherein said blend is viscous or a solid.

In one embodiment of the invention, there are provided compositions wherein Component (I) is a solid, a waxy, or a semi-solid material at room temperature.

In one embodiment of this invention, there are provided compositions wherein: (a) Components (I), (II) and (III) are combined in any order; or (b) Component (II) is first combined with Component (III); or (c) Components (I) and (II) are combined first; or (d) Component (III) is first combined with Component (I).

In one embodiment of this invention, there are provided compositions wherein Component (III) is first combined with Component (I) and the product thereof is then combined with Component (II). In this embodiment, the amine can have primary amine functionality and/or secondary amine functionality. In this embodiment, there are provided compositions wherein the amine has primary amine functionality.

In one embodiment of the invention, there are provided compositions wherein Components (I), (II), and (III) are combined together simultaneously in the same vessel.

In one embodiment of the invention, there are provided compositions wherein said composition is cured at 20° C. or higher in six days or less, and optionally, then post-cured at or above 20° C.

The compositions of the invention can comprise at least one additive selected from the group consisting of tackifiers, plasticizers, fillers, waxes, pigments, stabilizers, antioxidants, adhesion promoters, flame retardants, conductive agents, rheology modifiers and mixtures thereof, and the process of preparing the curable compositions of the invention may comprise an additional step of blending in one or more of these additives.

In various embodiments, the compositions of the invention can comprise at least 0.1, 0.5, 1, 2, or 3 and/or not more than 5 weight percent of at least one antioxidant, based on the total weight of the composition equaling 100 weight %.

One or more fillers, such as but not limited to talc, carbon black, calcium carbonate, titanium dioxide and zinc oxide, may be incorporated into the curable compositions of the invention. In various embodiments, the adhesives of the invention can comprise at least 1, 5, 10, 20, 30, or 40 and/or not more than 80, 70, 60, 55, 50 or 45 weight percent of at least one filler, based on the total weight of the compositions equaling 100 weight %. Moreover, the adhesives of the invention can comprise in the range of 1 to 80, 5 to 70, 10 to 60, 20 to 55, 30 to 50, or 40 to 45 weight percent of at least one filler, based on the total weight of the compositions equaling 100 weight %.

Further, in some embodiments, the composition of the invention may exclude one or more additives typically found in conventional compositions. For example, in some cases, the adhesive formed using the compositions of the invention can be used as a pressure sensitive adhesive (e.g., tapes and labels) and nonwoven adhesive applications without addition of oils or plasticizers that can possibly volatilize, migrate, or be extracted. For example, in some cases, adhesive compositions of the present invention can include not more than about 2, not more than about 1.5, not more than about 1, not more than about 0.5, not more than about 0.25, not more than about 0.1, or not more than about 0.05 weight percent of one or more oils or plasticizers, based on the total weight of the adhesive composition equaling 100 weight %.

In one embodiment of the invention, there are provided compositions wherein the composition does not contain: a polyvinyl alcohol, or a polyvinyl polymer, or a poly vinyl acetate polymer.

In one embodiment of the invention, there are provided compositions wherein neutralizing agents are not added to the composition after the polymerization reaction. In another embodiment of the invention, there are provided compositions wherein neutralizing agents can be added to the composition after the polymerization reaction.

Neutralizing agents can include but are not limited to primary amines, secondary amines, tertiary amines, and ammonia as well as any other neutralizing agent known in the art, for example, for water dispersible or water dispersed microgel compositions.

In one embodiment of the invention, there are provided compositions wherein the composition can contain residues of amine, formed from the use of at least one primary or at least one secondary amine, that may be incorporated into the composition during curing. The primary and/or secondary amines or amine salts useful in this invention can be used as catalysts or activating agents for the reaction of the β-ketoacetate (AcAc) group of Component (I) with the aldehyde functional groups of the composition and not as a neutralizing agent.

In one embodiment of the invention, there are provided compositions wherein the polyester resin is not an alkyd polyester resin and/or is not a polyester resin containing alkyd residues and/or fatty acid residues.

In one embodiment of the invention, there are provided compositions of the invention which is not a thermosetting composition.

In one embodiment of the invention, there are provided compositions of the invention which is a thermosetting composition.

In one embodiment of the invention, there are provided compositions wherein the composition of this invention does not contain compounds containing polysaccharide groups and/or oxidized polysaccharides having aldehyde functional groups.

In one embodiment of the invention, there are provided compositions wherein curing occurs between 1-ketoacetate (AcAc) functional Component (I) and the aldehyde functionality, forming carbon-carbon bonds.

In one embodiment of the invention, there are provided compositions that can be cured at low temperatures (e.g. <100° C.).

In one embodiment of the invention, there are provided compositions that can be cured at room temperature, or 10° C. to 130° C., or 200° C. to 130° C., or 20° C. to 120° C., or 200° C. to 115° C., or 20° C. to 110° C., or 20° C. to 105° C., or 20° C. to 100° C., or 20° C. to 90° C., or 20° C. to 80° C., or 20° C. to 70° C., or 30° C. to 130° C., or 30° C. to 120° C., or 30° C. to 115° C., or 30° C. to 110° C., or 30° C. to 105° C., or 30° C. to 100° C., or 30° C. to 90° C., or 30° C. to 80° C., or 30° C. to 70° C., or 40° C. to 130° C., or 40° C. to 120° C., or 40° C. to 115° C., or 40° C. to 110° C., or 40° C. to 105° C., or 40° C. to 100° C., or 40° C. to 90° C., or 40° C. to 80° C., or 40° C. to 70° C., or 50° C. to 130° C., or 50° C. to 120° C., or 50° C. to 115° C., or 50° C. to 110° C., or 50° C. to 105° C., or 50° C. to 100° C., or 50° C. to 90° C., or 50° C. to 80° C., or 60° C. to 130° C., 60° C. to 120° C., or 60° C. to 115° C., or 60° C. to 110° C., or 60° C. to 105° C., or 60° C. to 100° C., or 60° C. to 90° C., or 60° C. to 80° C., or 70° C. to 130° C., 70° C. to 120° C., or 70° C. to 115° C., or 70° C. to 110° C., or 70° C. to 105° C., or 70° C. to 100° C., or 60° C. to 90° C., or 70° C. to 80° C., or 80° C. to 130° C., 80° C. to 120° C., or 80° C. to 115° C., or 80° C. to 110° C., or 80° C. to 105° C., or 80° C. to 100° C., or 80° C. to 90° C., or 90° C. to 130° C., 90° C. to 120° C., or 90° C. to 115° C., or 90° C. to 110° C., or 90°

C. to 105° C., or 90° C. to 100° C., or 100° C. to 130° C., 100° C. to 120° C., or 100° C. to 115° C., or 10° C. to 30° C.

In another embodiment of the invention, there are provided compositions wherein, after curing, the compositions of the invention can be processed or used at temperatures of up to 130° C., or up to 120° C., or up to 115° C., or up to 110° C., or up to 105° C., or up to 100° C., or up to 95° C., or up to 90° C., or up to 85° C., or up to 80° C., or up to 75° C. At these temperatures, the compositions of the invention can maintain suitable adhesion or bond strength for the particular application. "Suitable adhesion or bond strength" can include but is not limited to any adhesion or bond strength values/measures contained herein or that are known to one of ordinary skill in the art for the particular application.

In one embodiment of this invention, the compositions of the invention are not water-dispersible polyester microgel compositions.

In one embodiment of the invention, acrylates are not blended with the acetoacetylated Component (I) of the invention/and or the compositions of the invention.

The curable adhesive composition of the invention can react at an ambient temperature in the presence of a base catalyst. In a so-called 2K system, it can be advantageous to mix two components of the composition shortly before use, to prevent the composition from premature reaction and becoming useless. In one embodiment of the present invention, the mixing of two components first does not result in significant reactions in the absence of a catalyst. Thus, the acetoacetylated resin and the curing agent may be mixed and stored until the mixture is ready to be used. The base catalyst can then be added shortly before use.

In one embodiment of the invention, there are provided compositions wherein said Component (III) comprises at least one primary amine or at least one secondary amine, salts thereof, or mixtures thereof.

In one embodiment of the invention, there are provided compositions wherein said amine is a solid.

In one embodiment of the invention, there are provided compositions wherein at least one curing agent of Component (II) is a solid.

In one embodiment of the invention, there are provided compositions that when cured at room temperature for seven days, has less than 80% loss, or less than 75% loss, or less than 50% loss, or less than 25% loss, or less than 20% loss, or less than 10% loss in 180 degree peel strength after further aging at 80° C. for seven days.

In one embodiment of the invention, there are provided compositions wherein Component (III) is present in an amount from about 0.5 to about 10 phr, or from about 0.5 to about 8 phr, or from about 1 to about 8 phr, or from about 1.5 phr to about 7 phr, based on the total weight of Component (I), the resin.

In one embodiment of the invention, there are provided compositions comprising a fourth component, Component (IV), which is at least one additive comprising at least one adhesion promoter, at least one green strength enhancer, or combinations thereof, or wherein said at least one additive is both an adhesion promoter and a green strength enhancer.

In one embodiment of the invention, there are provided compositions wherein Component (IV) is present in an amount from about 1 phr to about 70 phr, or from about 1 phr to about 60 phr, or from about 1 phr to about 50 phr, or from about 1 phr to about 40 phr, or from about 1 phr to about 30 phr, or from about 1 phr to about 25 phr, or from about 4 phr to about 56 phr, or from about 5 phr to about 50 phr, or from about 5 phr to about 40 phr, or from about 5 phr to about 30 phr, or from about 5 phr to about 25 phr, or from about 10 phr to about 50 phr, or from about 10 phr to about 40 phr, or from about 10 phr to about 30 phr, or from about 10 phr to about 25 phr, or from about 10 phr to about 20 phr, based on the total weight of Component (I), the resin.

In one embodiment of the invention, there are provided compositions wherein Component (IV) is present from about 10 phr to about 25 phr, based on the total weight of Component (I), the resin.

In one embodiment of the invention, there are provided compositions wherein the green bond strength of the cured adhesive composition is increased by addition of Component (IV). Alternatively, the green bond strength of the composition which includes Component (IV) is greater than the green bond strength of the composition which does not include Component (IV). Component (III) levels can contribute to green bond strength.

"Green bond strength" or "green strength" is defined herein as the ability of a composition to hold two surfaces together when brought into contact and before the composition develops its ultimate bond properties when fully cured and as defined in ASTM 907. Good green strength is desirable, in some instances, because it can relate to a composition's resistance to deformation and fracture before complete curing. In addition, good green strength, in some instances, can indicate that a composition will withstand mechanical operations or other processing techniques.

Tackifying resins (tackifiers) can be added to the curable compositions of the invention to modify the adhesive or coating properties, including but not limited to the green strength, viscosity, wetting behavior, adhesion, particularly to low energy surfaces, and viscoelastic behavior of the finished adhesive or coating composition. The tackifier resin selected may vary depending on the exact curable composition and the balance of properties needed in an application, such as peel strength, shear strength, and tack. These properties are important to adhesive compositions and the best advantages are achieved where the overall balance of these properties, both initially and over time in different environmental conditions, have been optimized.

Tackifier resins that may be present in the adhesive compositions include, without limitation, cycloaliphatic hydrocarbon resins, C5 hydrocarbon resins, C5/C9 hydrocarbon resins, aliphatic-aromatic hydrocarbon resins, aromatically modified C5 resins (commercially available as Piccotac™ resins, Eastman Chemical Company, TN, US), C9 hydrocarbon resins, C9 hydrocarbon resins (commercially available as Picco™ resins, Eastman), pure monomer resins, e.g. copolymers of styrene with alpha-methyl styrene, vinyl toluene, para-methyl styrene, indene, and methyl indene (commercially available as Kristalex™ resins, Eastman), dicyclopentadiene (DCPD) resins, dicyclopentadiene based/containing resins, cyclopentadiene based/containing resins, terpene resins (commercially available as Sylvares™ resins, AZ Chem Holdings, LP, Jacksonville, Fla., US), terpene phenolic resins, terpene styrene resins, rosin acid resin, esters of rosin (commercially available as Permalyn™ resins, Eastman), esters of modified rosins, liquid resins of fully or partially hydrogenated rosins, fully or partially hydrogenated rosin esters (commercially available as Foral™ E and Foralyn™ resins, Eastman), fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated DCPD resins (commercially available as Escorez® 5000-series resin), fully or partially hydrogenated modified DCPD resins (commercially available as Escorez® 5600-series resin), both Escorez® resins available from ExxonMobil Chemical Company, TX, US), fully or partially hydrogenated modified dicyclopentadiene based/containing resins, aromatically modified C5 resins (commercially available as Piccotac™ resins, Eastman Chemical Company, TN, US), fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene, indene, and methyl indene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and/or combinations thereof.

In one embodiment of the invention, there are provided compositions wherein said Component (IV) can be selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated modified dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and/or combinations thereof.

In one embodiment of the invention, there are provided compositions wherein said tackifiers can be selected from C5 hydrocarbon resins, C9 hydrocarbon resins, aliphatic-aromatic hydrocarbon resins, aromatic hydrocarbon resins, pure monomer hydrocarbon resins, aliphatic-aromatic hydrocarbon resins, fully or partially hydrogenated C9 resins, rosin ester resins, and/or combinations thereof.

The compositions in the invention can be useful as a "warm" melt adhesive for those applications where hot melt adhesives are currently employed and applied by techniques known to those skilled in the art. The melting point and/or ring and ball softening point (RBSP) of one or more tackifier resins in the curable composition can be selected to suit the intended end use for the curable composition, where RBSP is measured by ASTM D6493-11 "Standard Test Methods for Softening Point of Hydrocarbon Resins and Rosin Based Resins by Automated Ring-and-Ball Apparatus." In various embodiments, the tackifier resin has a RBSP from –10° C. to 160° C. In some embodiments, the tackifier resin has an acid number in the range of 0 to 170, 0 to 30, 0 to 25, or 0 to 11 mg KOH/g. In some embodiments, tackifier resins with zero or low acid numbers are preferred to reduce interference with the base catalyst. In some embodiments, tackifier resins can have moderate or high acid numbers, for example, where the primary and/or secondary amine is buffered.

In other embodiments, tackifier resins with RBSP above the expected application temperature and with acid numbers of about 5 to about 10, or of about 11 to about 22, or of about 145 to about 165 mg KOH/g, can be added in amounts up to an equimolar amount of base catalyst in order to act as a base scavenger at high temperatures and improve thermal stability of the cured composition as well as to provide improved adhesion. Non-limiting examples of tackifier resins that may be used include Poly-Pale™ (AN 155, RBSP 103° C.), Dymerex™ (AN 145, RBSP 144° C.), Foral™ AX-E (AN 165, RBSP 8° C.), Permalyn™ 6110 (AN 13, RBSP 103° C.), and Foralyn™ 90 (AN 8, RBSP 82° C.) (Eastman).

Any conventionally known wax which is suitable for use in formulating adhesives can be used in the practice of the invention. Suitable waxes can include, for example, microcrystalline wax, paraffin wax, waxes produced by Fischer-Tropsch processes, functionalized waxes (maleated, fumerated, silanated, or wax with functional groups etc.), polyolefin waxes, petroleum waxes, polypropylene waxes, polyethylene waxes, ethylene vinyl acetate waxes, and vegetable waxes.

Non-limiting examples of commercially available waxes that can be suitable for this invention include A-C™ 9 and A-C™ 810, available from Honeywell International Inc. Morristown, N.J., US; POLYWAX™ 400, 850, 1000, and 3000 from Baker Hughes Inc., Sugar Land, Tex., US; Licocene™ PE4201 from Clariant International LTD, Muttenz, Switzerland; Epolene™ N-15, Epolene™ C-10, Epolene™ C-17 and Epolene™ C-18 from Westlake Polymers, LLC, Houston, Tex., US; Sasolwax™ 3279 microcrystalline wax from Sasol Chemical Industries Limited, South Africa; and microcrystalline wax Be Square™ 195 (Baker Hughes).

In various embodiments, adhesives comprising the curable compositions of the inventions can comprise at least 1, 2, 5, 8, or 10 and/or not more than 40, 30, 25, 20, or 15 weight percent of at least one tackifier based on the total weight of the final composition equaling 100 weight %. Moreover, said adhesives can comprise in the range of 1 to 40, 5 to 30, 8 to 25, or 10 to 20 weight percent of at least one tackifier.

Furthermore, a functionalized wax may react with the curable composition, reducing the amount of material that may potentially migrate from the adhesive or coating. Suitable functionalized waxes include but are not limited to Honeywell A-C™ 596; Clariant Licocene™ MA6252 and Licocene™ MA6452; and Westlake Epolene™ E-43.

In one embodiment of this invention, there is provided a curable composition of the invention having initial green strength and cured bond strength wherein:
(a) Component (I) comprises at least two functional groups selected from the group consisting of β-ketoacetate and malonate functional groups;
(b) Component (II) comprises at least one curing agent having at least two aldehyde functional groups;
(c) The equivalent ratio of the acetoacetate (AcAc) functional group of Component (I) to the aldehyde functional group is from about 3 to 0.25, or from about 3 to 0.5, or from about 2.5 to 0.25, or from about 2.5 to 0.5, or from about 2.5 to 0.6, or from about 2 to 0.25, or from about 2 to 0.5, or from about 2 to 0.6, or from about 1.2 to 0.8;
(d) Component (III) is at least one amine having primary and/or secondary, amine functionality, or combinations thereof;
(e) Component (IV) is at least one tackifier resin, wherein:
  a. the tackifier resin can be present in an amount from about 1 phr to about 70 phr, or from about 10 phr to about 60 phr, or from about 10 phr to about 25 phr, based on the total weight of Component (I), the resin; and,
  b. the tackifier resin can be selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, rosin acid resins esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof; and c. wherein the 180-degree peel strength and/or T-peel strength of the composition is greater than when a tackifier resin or other adhesion promoter is not present in the same composition.

In one embodiment of the invention, there are provided compositions comprising adhesion promoters and/or green strength enhancers, for example, tackifiers, wherein the composition is cured.

In one embodiment of the invention, there are provided compositions wherein the 180-degree peel adhesion and/or T-peel strength of the composition is greater than when a tackifier resin or other adhesion promoter is not present in the same composition.

In one embodiment of the invention, there are provided compositions wherein the 180-degree peel adhesion and/or T-peel strength of the composition is at least 100 percent greater than when tackifier or other adhesion promoter is not present in the same composition.

In one embodiment of the invention, there are provided compositions wherein the tackifier resin can be present in an amount up to about 65 parts per hundred acetoacetylated polyester and/or polyether [Component (I)]; and wherein the 180-degree peel adhesion of the composition is greater than when tackifier or other adhesion promoter is not present.

In one embodiment, the compositions of the invention that contain Component (IV) demonstrate retention of cohesive strength as measured by the 180 peel test as described herein. In another embodiment, the compositions of the invention that contain Component (IV) in an amount up to 25 weight %, or up to 20 weight % or up to 15 weight %, demonstrate either no loss of cohesive strength or a loss of no more than 20%, or no more than 15%, or no more than 10%, or no more than 5%, of cohesive strength as measured by the 180 peel test measured as described herein.

In one embodiment of the invention, there are provided compositions wherein at least one additive to promote adhesion or green strength enhancement or both (Component (IV) is first combined with (a) Component (I), Component (II), or Component (III); or (b) Component (I) and Component (II); or (c) Component (II) and Component (III); or (d) Component (I) and Component (III) or (e) any order of combination of Components (I)-(IV) can be used.

In various embodiments, the curable adhesive compositions can be applied in the range of about 0.5 gsm to about 200 gsm (gsm=grams per square meter). In embodiments where the curable composition will be used to bond substrates to each other, the add-on rate used will be suitable for generating laminates or composites with the desired bond strength. The curable composition can be applied to one or both substrates before the substrates are brought into contact to form a composite, laminate or article. The article so formed may be optionally contacted with additional substrates, additional curable compositions, adhesives, and/or may be subjected to applied pressure and/or applied heat, in any order or combination without limitation.

A "solid" is defined herein as not a liquid or gas at room temperature and/or at application temperature and can include but is not limited to waxy and/or semi-crystalline materials.

In one embodiment of the invention, there is provided a process for maintaining the temperature of Components I-III of any of the compositions of the invention such that spontaneous polymerization is not induced until activation, e.g., thermal activation.

In one embodiment of the invention, there is provided a process for preparing and curing a reactive adhesive comprising preparing a composition of the invention for a reactive adhesive and applying heat from an external source at a temperature above or at ambient temperature to said composition, whereby polymerization is initiated.

In one embodiment of the invention, there is provided a process for forming a laminate structure, comprising the following steps: (1) forming an adhesive composition by combining at least Components (I)-(III) of any of the compositions of the invention; and (2) applying the adhesive composition to a surface of a first substrate; thereby forming the laminate structure.

In one embodiment, an article of manufacture is provided comprising at least one flexible substrate coated with at least one composition of the invention.

In one embodiment, an article of manufacture is provided comprising at least two substrates wherein said substrates comprise flexible film and wherein between said substrates of flexible film is at least one of the compositions of the invention which has cured.

In one embodiment of the invention, the article of manufacture of the invention can be a laminated structure.

In one embodiment of the invention, there is provided a process for preparing a flexible laminate comprising applying at least one of Components (I)-(III) of any of the compositions of the invention independently on the surface of a first flexible substrate, applying the remaining components of Components (I)-(IV) independently on the surface of a second flexible substrate, and then curing said combined components, optionally, by applying thermal energy, UV energy, pressure, moisture or other sources of activation to the flexible film laminate.

In one embodiment of the invention, there is provided the above process wherein at least one of the adhesive compositions of the invention is then cured, for example, at or near room temperature.

In one embodiment of the invention, there is provided a process wherein at least one composition of the invention can be applied to a first substrate or, optionally, can be applied to two or more substrates, wherein each substrate can be independently selected from the group consisting of a wood material, a metallic material, a plastic material, an elastomeric material, a composite material, a paper material, a fabric material, a glass material, a foamed material, a metal, a mesh material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material.

In one embodiment of this invention, there is provided a process wherein at least one composition of the invention can be applied to a first substrate or, optionally, can be applied to two or more substrates, wherein each substrate can be independently, wherein the first substrate and the second substrate can each be independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In one embodiment of the invention, there is process wherein at least one adhesive composition of the invention can be applied to a first substrate and, optionally, can be applied to a second substrate and can each be independently selected from a polyester composite, a glass composite, or a wood-plastic composite.

In one embodiment of the invention, there is provided a process wherein at least one composition of the invention can be applied to a first substrate or, optionally, can be applied to two or more substrates, wherein each substrate can be independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

In one embodiment, there is provided an article of manufacture comprising at least one composition of the invention and/or processed by any of the processes of the invention.

In one embodiment, there is provided an article of manufacture comprising at least one composition of the invention and further comprising one or more substrates or two or more substrates, e.g., flexible substrates, assembly part substrates, automobile interior substrates, woodworking substrates, furniture part substrates, etc. "Flexible substrate" is defined herein as a substrate that is less than 10 mil thick. "Flexible film" is defined herein as a film that is less than 10 mil thick. "Flexible film substrate" is defined herein as a film substrate that is less than 10 mil thick.

In one embodiment, there is provided an article of manufacture comprising at least two substrates wherein at least one composition of the invention is applied to the first substrate and wherein the second substrate can be contacted with said composition.

In one embodiment, there is provided an article of manufacture which is layered with multiple substrates wherein at least one composition of the invention is layered between at least two of said substrates.

In one embodiment, there is provided an article of manufacture comprising at least one composition of the invention which is a laminate structure.

In one embodiment, there is provided an article of manufacture wherein at least one composition of the invention is applied to at least one surface of a multi-laminated structure.

In one embodiment, there is provided an article of manufacture comprising at least one composition of the invention selected from the group consisting of: an adhesive, a laminate, a tape, a label, a tag, a radio frequency identification (RFID) tag, a coating, a sealant, a film (whether or not flexible), a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a flexible packaging multilayer.

In one embodiment, the substrates used in the articles of manufacture of the invention can be flexible film substrates comprising at least one composition of the invention.

In one embodiment, there is provided a process for preparing a flexible film laminate comprising: (1) applying at least one of Components (I)-(III) of the compositions of the invention independently on the surface of a first flexible film substrate, (2) applying the remaining component(s) of said Components (I)-(III) independently on the surface of a second flexible film substrate, and (3) combining said substrates and then curing said combined components, thus forming a cured composition.

In one embodiment, the articles of manufacture of the invention can be assembly components or parts including but not limited to automobile parts, woodworking parts, and/or furniture parts comprising at least one composition of the invention.

In one embodiment, the article of manufacture of the invention can comprise an adhesive. The adhesive compositions of the invention can comprise any one of the compositions of the invention. In one embodiment, the adhesive compositions of the invention can be reactive adhesives. In one embodiment, the adhesive compositions of the invention can be curable or cured.

In one embodiment, any of the adhesive compositions of the invention can be applied to a substrate at any thickness known in the art for a particular application, for example, from about 0.5 microns to about 50 microns, or from about 0.5 microns to 5 microns, for example, for some flexible packaging applications.

In one embodiment, any of the adhesive compositions of the invention can be applied to a substrate at any thickness known in the art for a particular application, including but not limited to 50 to 200 microns or 50 to 150 microns or 75 to 125 microns, for example, for some assembly applications such as auto assembly or woodworking assembly.

The compositions of this invention can provide desirable properties for a variety of applications. In certain embodiments, the compositions of this invention are suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

In one embodiment, any of the adhesive compositions of the invention can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, hygiene core integrity adhesive, packaging adhesive, and hygiene core integrity adhesive.

In some embodiments, such as pressure sensitive adhesives, the curable compositions of the present invention can be characterized by adhesive strength by 180-degree peel test e.g. according to ISO 8510-2-2006 Part 2 at 5 mm/sec or PSTC-101 (Method A), cohesive strength and/or temperature resistance by static shear hold power testing (room temperature or elevated temperature, e.g., 40° C. or 70° C.) by PSTC-107 and/or by shear adhesion failure temperature (SAFT) by PSTC-17.

In one embodiment, the articles of manufacture of the invention can be coating compositions.

In one embodiment, the article of manufacture of the invention can comprise a cured composition wherein the bond is maintained after cure and/or post-cure at or above about 23° C.; at or above about 60° C.; or at or above about 120° C.

In one embodiment of the invention, acrylates are not included within the compositions of the invention and/or adhesives made therefrom and/or articles of manufacture of the invention made therefrom.

Formulations based on such acetoacetylated compounds, e.g., polyesters and aldehyde compounds, are especially suitable for low-temperature curing adhesive applications without the use of isocyanates. Primary and secondary amines can offer options for improved thermal stability.

The compositions of the present invention may be prepared according to any suitable method, techniques and equipment. For example, the components of the composition may be blended in a mixer, an extruder, an aluminum can, and/or at the point of application, e.g. a head mixing system. In some cases, the components of the composition may be blended, optionally with a solvent, to form a mixture, which can then be cast onto a backing or other substrate and dried or partially cured to form an article comprising the curable composition.

Furthermore, the composition may be shaped into a desired form, such as a tape or sheet, by an appropriate technique including casting, extrusion, or roll coating techniques (gravure, reverse roll, etc.). Alternatively, the composition may be applied to a substrate using conventional adhesive application equipment recognized in the art, e.g. curtain coating, slot-die coating, wire-wound rod coating, gravure coating, roll coating, knife coating, hot or "warm" melt coating. The composition may be applied as either a continuous or discontinuous coating or film or layer or sprayed through different nozzle and/or head configurations at different speeds using typical application equipment. The application may be followed by drying or heat treatment.

In another embodiment, the curable adhesive of the present invention is a laminating adhesive for flexible packaging. The curing temperature for such an adhesive is desirably a low temperature ranging from room temperature to about 50° C.

After formulation, the curable adhesive can be applied to a substrate and subsequently laminated to another substrate. Suitable substrates include but are not limited to textile, fabric, mesh, film, poly(acrylonitrile butadiene styrene) (ABS), polypropylene (PP), glass-filled PP, talc-filled PP, impact-modified PP, polycarbonate (PC), PC-ABS, biaxially oriented polypropylene (BOPP), thermoplastic polyolefin (TPO) compounds, pigmented TPO compounds, filled TPO compounds, rubber-modified TPO compounds, paper, glass, plastic, metal, PVC (polyvinyl chloride), PET (polyethylene terephthalate), modified PET such as PETG (PET modified with 1,4-cyclohexanedimethanol) and PCTG, Mylar™ plastic, aluminum, leather, synthetic leather, vinyl, nonwoven materials, foams, painted surfaces, printed surfaces, thermosets, thermoplastics, polymer films such as polyethylene, polypropylene, oriented polyethylene, oriented polypropylene; metallized plastic films; aluminum foil; wood; metals such as aluminum, steel or galvanized sheeting; glass; urethane elastomers; primed (painted) substrates, and laminates, blends or coated substrates comprising at least one of these materials. Any of these substrates may be untreated, corona treated, chemically treated, plasma treated, flame treated, rubber-modified, impact-modified, filled with e.g. talc or glass, pigmented with e.g. carbon black, chromium oxide or titanium oxide, or otherwise modified as known by those skilled in the art to provide improved properties to the substrate.

The curable adhesive can be coated onto a substrate using techniques known in the art, for example, by spraying, draw-down, roll-coating, brushing, nozzle dispensing, printing, etc. and subsequently laminated to another substrate manually or by a roll-to-roll laminating machine. The coating and laminating process may be done at room temperature or elevated temperatures. The laminated films may be cured at room temperature or elevated temperatures. In various embodiments, the curable mixture of the present invention can cure at 20° C. in various amounts of time. In one embodiment, the curable mixture of the present invention can cure at 20° C. or higher in six days or less.

In certain embodiments of the invention, the compositions of the invention can be prepared by a process comprising: (a) mixing at least one component having two or more β-ketoester functional groups, and at least one component having two or more aldehyde functional groups with at least one primary or secondary amine, and (b) after optional activation, curing the composition at 20° C. or higher, for example, in six days or less, and (c) optionally, post-curing the composition at or above 20° C.

In certain embodiments of the invention, the compositions of the invention can be prepared by a process comprising: (a) mixing at least one component having two or more R-ketoester functional groups, and at least one component having two or more aldehyde functional groups with at least one primary or secondary amine, and (b) after optional activation, curing the composition at or above 20° C., or above 35° C., or above 50° C., or above 55° C., or above 70° C., or above 80° C., or above 100° C., or from 20° C. to 130° C., or from 50° C. to 130° C., or from 50° to 80° C., in any time known to one of ordinary skill in the art, for example, in six days or less, and (c) optionally, post-curing the composition at or above 20° C., or above 35° 0, or above 55° C., or above 70° C., or above 80° C., or above 1000° C., or from 20° to 110° C., or from 50° to 110° C.

In some embodiments, the curable compositions of this invention can be cured at temperatures above 200, or above 350, or above 50° C., or above 55° C., or above 70° C., or above 80° C., or above 100° C., and can then be post-cured at a higher temperature(s) above 20° C., or above 35° C., or above 55° C., or above 70° C., or above 80° C., or above 100° C.

In some embodiments, the curable compositions of this invention can be partially cured before being applied to a substrate, used in a laminate, molded or otherwise incorporated into an article.

In some embodiments, the curable compositions of the present invention can be characterized by lap shear testing:

ASTM D3163-01 (2014) Standard Test Method for Determining Strength of Adhesively Bonded Rigid Plastic Lap-Shear Joints in Shear by Tension Loading. Impact strength can also be measured by any method known in the art, for example, by pendulum or ball drop impact tests.

In some embodiments, the curable compositions of the present invention can be used in flexible packaging and characterized by tests such as DIN ISO 53357 Internal Adhesion, DIN ISO 55529 Sealed Seam Strength, DIN 53357 Bonding Adhesion, DIN 53504 Elongation at Tear and Tearing Tension, ASTM D1003 Transparency of film, ASTM D2578 Wetting Tension of Film Surface, ASTM F1249 Water Vapor Transmission Rate, and/or ASTM F2622 or D3985 Oxygen Transmission Rate The inventive compositions can exhibit improved heat resistance and/or improved adhesion over time, particularly after heat aging, as evidenced by tests such as elevated temperature aging of the adhered articles comprising the inventive compositions, followed by lap shear testing, by fiber tear testing, by peel testing, by peel adhesion failure temperature (PAFT) testing, by shear adhesion failure temperature (SAFT) testing, and/or by shear hold power testing at elevated temperatures such as 40° C., 60° C., 70° C., 85° C., 95° C., 105° C., 120° C. The adhered articles comprising the compositions of the invention can also exhibit improved humidity resistance as evidenced, for example, by aging at 95 to 100% relative humidity at 40° C. for 24 to 144 hours followed by any of the above listed adhesion and cohesion tests at room temperature and/or at elevated temperature.

Improved chemical resistance of the compositions can be shown by reduced degradation of adhesive and cohesive strength after exposure to selected chemicals. In general, resistance to solvents, water, foods, cleaning products and other chemicals can be measured by direct exposure up to and including immersion for a period of time followed by adhesive and cohesive testing as described above to compare to pristine material testing. Visual observations are made in general for degradation of articles during/after exposure. Uptake of the test fluid can be measured gravimetrically or spectroscopically.

In all embodiments of the invention, the primary and/or secondary amines useful in the invention can act as catalyst or activating agent.

Unpredictably, the compositions useful in this invention have a good combination of properties including but not limited to good thermal stability, the ability to cure and/or crosslink, good aging resistance, good cure rate, good green strength, good peel strength, and ability to adhere to various substrates.

The following examples further illustrate how the polyesters useful in the invention can be made and evaluated, and how the curable compositions useful in this invention can be made and evaluated and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

Table 1 below provides the following abbreviations which apply throughout the working examples and specification:

TABLE 1

| Abbreviations, Substrates, and Coverstocks | |
|---|---|
| Aldehyde abbreviations: | |
| CHDAL | Paraloid Edge XL-195 (Dow) - mixture of 1,3- and 1,4-CHDAL |
| Curing agent amount is given as equivalents (moles aldehyde functional groups to moles AcAc functional groups in resin), e.g., 1.0 equiv means that there is one mole of aldehyde functional groups on the curing agent per mole AcAc functional groups on the resin. | |
| Amine abbreviations: | |
| MPMDA | 2-Methylpentamethylenediamine |
| DBU | 2,3,4,6,7,8,9,10-Octahydropyrimido[1,2-a]azepine |
| Amine amount is reported in parts per hundred resin (phr), e.g., 1.5 phr means 1.5 g amine per 100 g AcAc resin. | |
| Rigid substrates for 180 degree peel test: | |
| PP | Polypropylene (Dow Inspire C702-200), 0.125" thickness, from Standard Plaque Inc. (Melvindale, MI) |
| PC - Lexan ™ | Lexan ™ 141 polycarbonate, 0.125" thickness, from Standard Plaque Inc. (Melvindale, MI) |
| Coverstock for 180 degree peel test: | |
| CGT brown PVC | P1NEAC Longitude 704S obtained from CGT Limited (Cambridge, ON) |
| Blue marine vinyl | Marine vinyl fabric purchased from Jo-Ann Fabrics |
| Mueller 3-mesh fabric | Teflon-coated 3-mesh spacer fabric (T5977-0370-1480-01T1), obtained from Mueller Textiles |
| Abbreviations for monomers used to make polyester resins: | |
| AD | Adipic acid |
| IPA | Isophthalic acid |
| TPA | Terephthalic acid |
| HHPA | Hexahydrophthalic anhydride |
| TMP | Trimethylolpropane |
| NPG | Neopentyl glycol |
| MPD | 2-Methyl-1,3-propanediol |
| HD | 1,6-Hexanediol |
| TMCD | 2,2,4,4-Tetramethyl-1,3-cyclobutanediol |

TABLE 1-continued

| Abbreviations, Substrates, and Coverstocks | |
|---|---|
| PEG | Polyethylene glycol |
| BDO | 1,4-Butanediol |
| CHDM | 1,4-Cyclohexanedimethanol |

Experimental Procedures

Preparation of Laminates Consisting of Solid and Flexible Substrates for 180-Degree Peel Testing A 10 mil drawdown bar was used to form a film (target thickness: 4 mil) of the composition on solid substrates (1'×6"). A flexible coverstock was placed over the composition, and a handheld roller was rolled over the sample twice to laminate the sample. Unless otherwise noted, the samples were cured at ambient conditions for 7 days. Peel testing was done either after 7 days cure or after an additional 7 day post-cure at 80° C.

The samples were tested for 180-degree peel strength following ISO 8510-2-2006 Part 2 at 5 mm/s (12 inch/minute) crosshead displacement rate using either an MTS Criterion Universal Tensile Tester model C43-104E, 500 Newton load cell (MTS Systems Corporation, Eden Prairie, Minn., US) or an Instron Model 4201. A minimum of three samples of each composition were tested and the average and standard deviation reported.

Procedure for Determination of Acetoacetate Number

In the Examples herein, analysis of the acetoacetate (AcAc) number of the resin employs a potentiometric titration method based on the titration of the proton in the AcAc group with a strong base, tetrabutylammonium hydroxide solution (TBAOH) in methanol. The titration was conducted on a titrator (904 Titrando, Metrohm AG, US) equipped with Tiamo software and a pH electrode (DG116-solvent, Mettler Toledo, US) as sensing probe. Depending on the expected AcAc number of the sample, 0.05 to 0.5 grams sample was weighed to a titration cell and stirred to dissolve in 35 mL pyridine at room temperature. The sample solution was titrated to the endpoint at pH around 16, which was determined by Tiamo software or manually. The AcAc number, reported as mg KOH/g sample, was calculated from the volume of TBAOH used at the titration endpoint, its normality, and weight of sample.

Example 1. Synthesis of Acetoacetate Functional Polyester 1 (Resin 1) Hydroxyl Functional Polyester 1

A 2-L kettle with a four-neck lid was equipped with a mechanical stirrer, a thermocouple, a heated partial condenser (115° C.), a Dean-Stark trap, and a chilled condenser (1500). To the flask were charged neopentyl glycol (NPG) (178.6 g), 2-methyl-1,3-propanediol (MPDiol) (154.6 g), trimethylolpropane (TMP) (131.5 g), adipic acid (AD) (511.5 g), and the acid catalyst, Fascat-4100 (Arkema Inc.) (0.98 g). The reaction was allowed to react under nitrogen at 170° C. for one hour, at 200° for one hour, and at 230° C. for about 3 hours to yield a clear, viscous mixture. A total of 126 g of the distillate was collected in the Dean-Stark trap. The resulting mixture was allowed to cool to 12000 for the reaction with t-butyl acetoacetate below. Acid number: <1.0 mg KOH/g; hydroxyl number: 165.5 mg KOH/g; glass transition temperature (Tg): −49.6° C.; number average molecular weight (Mn): 2050 g/mole; weight average molecular weight (Mw): 5921 g/mole.

Acetoacetate Functional Polyester 1:

To the above hydroxyl-functional polyester 1 (850 g) was added t-butyl acetoacetate (359 g). The mixture was gradually heated and allowed to react at 120° C. for 20 minutes and at 140° C. for two hours. A total of 144 g of the condensate (t-butanol) was collected in the Dean-Stark adapter. The resulting viscous resin was allowed to cool and subsequently collected. Glass transition temperature (Tg): −50.9° C.; number average molecular weight (Mn): 1873 g/mole; weight average molecular weight (Mw): 6004 g/mole; AcAc number 124 mgKOH/g.

The resins in Examples 1-3 were prepared and tested as in Example 1 and the compositions and properties are as shown in Table 2.

TABLE 2

| Composition and Properties of Acetoacetylated Polyesters | | | | | | | | | |
|---|---|---|---|---|---|---|---|---|---|
| Example and Resin Number | MPD (g) | TMP (g) | Adipic Acid (g) | 1,6-hexanediol (g) | Other Monomer | t-Butyl Acetoacetate (g) | Mw/Mn (g/mol) | Tg (° C.) | Acetoacetate # (mg KOH/g) |
| 1 | 154.6 (1.70 moles) | 131.5 (0.97 moles) | 511.5 (3.50 moles) | 0 | NPG 178.6 (1.71 moles) | 359 (3.04 moles) | 6004/1873 | −50.9 | 124 |
| 2 | 221.4 (2.46 moles) | 48.84 (0.36 moles) | 613.8 (4.20 moles) | 290.4 (2.46 moles) | 0 | 28.2 (0.24 moles) per 100 g resin | 3933/1667 | −64.7 | 86 |
| 3 | 154.6 (1.70 moles) | 131.5 (0.96 moles) | 255.7 (1.75 moles) | 0 | IPA 290.7 (1.75 moles) NPG 178.6 (1.71 moles) | 374 (3.17 moles) | 6390/2003 | −32.6 | 123 |

Examples 4-8: Addition of Solid Tackifier Resins with Varying Polarity

Compositions were prepared in the amounts shown in Table 3 where the following tackifier resins were included as finely ground particles in the curable compositions: Permalyn™ 6110, a pentaerythritol ester of gum rosin, acid number of 13 mg KOH/g; Permalyn™ 2095, a glycerol ester of gum rosin, acid number of 8 mg KOH/g; Foralyn™ 90, a hydrogenated glycerol ester of gum rosin, acid number of 6 mg KOH/g; and Kristalex™ 3070, an aromatic hydrocarbon (pure monomer) resin, acid number of 0 mg KOH/g, all from Eastman Chemical Company, Kingsport, Tenn., USA.

Each curable composition containing tackifier resin was mixed and poured between two sheets of 2 mil untreated polyethylene terephthalate (PET) film separated with 4.5 mil RP12 release paper (ChemInstruments, OH, USA) as spacers to form a laminate with 2-4 mils adhesive thickness. The laminate was cured for 20 seconds at 110° C. in a heated Carver press. The laminates were post-cured for 24 hours at room temperature, 60° C. or 120° C., and then the bond strength was tested. Rectangular strips measuring 1"×10" of each composition were tested at 5 mm/s (12 inch/minute) crosshead displacement rate using an MTS Criterion Universal Tensile Tester model C43-104E (MTS Systems Corporation, Eden Prairie, Minn., US). A minimum of three samples of each composition were tested and the average and standard deviation reported in Newtons per meter (N/m). Unpredictably, even when the ring and ball softening point of the tackifier resin was not passed during the cure profile, it was found that the laminate bond strength was significantly improved after post-cure when tackifier resin is present in the composition compared to Example 8, which did not have tackifier added.

added, and the final composition was mixed approximately 60 seconds in a Speedmixer™ by FlackTec Inc., SC, USA, model DAC 400.2 VAC, and used immediately. The AcAc/CHO ratio was 1.0, and 1.5 phr of amine was added based on the polyester resin. Either 36.5 phr or 10.25 phr tackifier resin was added based on the weight of Component (I) (Resin 1), corresponding to about 14.6 weight percent or about 4.1 weight percent of the entire composition, respectively.

Substrates were wiped clean with isopropyl alcohol and air dried for at least ten minutes. A 10 mil drawdown bar was used to form a film of the composition (target thickness: 4 mil) on an array of six 1"×6" substrates, either Lexan™ 141 polycarbonate (PC) or polypropylene (PP). A coverstock approximately 6"×12" was placed over the adhesive, and a handheld 2-lb roller was rolled over the sample twice to laminate the sample. The samples were cured as described in Table 4. After the prescribed cure cycle was completed, the coverstock was cut to separate the laminated samples, and the outer two samples were discarded.

Samples were tested for 180-degree peel strength at 5 mm/s (12 inch/minute) crosshead displacement rate using either an MTS Criterion Universal Tensile Tester model C43-104E (MTS Systems Corporation, Eden Prairie, Minn., US) or an Instron Model 4201, following ISO 8510-2-2006 Part 2 at 5 mm/sec. A minimum of three samples of each composition were tested and the average and standard deviation reported.

Two levels of the tackifier resin were tested as adhesion promoters on PC and PP substrates and cured in an oven for two hours at 120° C. All laminates prepared with PC substrates exhibited cohesive failure within the cured composition, so no effect on adhesion could be determined.

TABLE 3

Curable Compositions Comprising Tackifier Resins and Determination of Bond Strength (standard deviation in parentheses)

| Example Number | 4 | 5 | 6 | 7 | 8 |
|---|---|---|---|---|---|
| Resin 2 (g) | 100 | 100 | 100 | 100 | 100 |
| CHDAL (g) | 10 | 10 | 10 | 10 | 10 |
| DBU (g) | 1.2 | 2 | 2 | 2 | 2 |
| Permalyn ™ 6110 tackifier resin | 5 g | — | — | — | — |
| Permalyn ™ 5095 tackifier resin | — | 5 g | — | — | — |
| Kristalex ™ 3070 tackifier resin | — | — | 5 g | — | — |
| Foralyn ™ 90 tackifier resin | — | — | — | 5 g | — |
| PET/PET Laminate bond testing with cure conditions* | | | | | |
| T-peel, 24 hrs, RT (N/m) | 25 (3) | 38 (5) | 32 (8) | 40 (5) | 41 (6) |
| T-peel, 24 hrs, 60° C. (N/m) | 61 (11) | 39 (7) | 38 (8) | 28 (8) | 34 (1) |
| T-peel, 24 hrs, 120° C. (N/m) | 92 (31) | 93 (24) | 79 (24) | 86 (29) | 70 (16) |

*T-peel tests were done as described in PSTC-101 Method A, following 24 hour curing at the listed temperature.

Examples 9-13: Preparation and Testing of Laminates Comprising Solid Tackifier Resins with Varying Polarity to Improve Adhesion The examples provided here illustrate improved adhesion to the non-polar substrate polypropylene upon addition of aromatic hydrocarbon resin Kristalex™ 3070, aliphatic-aromatic hydrocarbon resin Regalite™ S5090, or the polar rosin ester Eastman™ Ester gum 8 to a curable composition based on CHDAL, MPMDA amine and polyester Resin 1 with Mw 6004 g/mole; AcAc number 124 mgKOH/g prepared from NPG, MPDiol, TMP and AD.

Tackifier resin was ground with mortar and pestle and the specified amount was mixed with 6.2 g of the dialdehyde curing agent CHDAL. AcAc Resin 1) (40 g) was mixed with the tackifier/curing agent mixture, 0.60 g of the amine was Unpredictably the cohesive strength measured by the peel test did not exhibit statistically significant variation, indicating that the composition cured even with over 14 weight % additive, Table 4.

In contrast, samples with CGT coverstock adhered to PP exhibited 20%, 5% or zero cohesive failure of the cured composition and over 80 percent adhesive failure to the PP surface. The composition without tackifier resin had 100% adhesive failure to the PP. Unpredictably, the addition of only about four weight percent or about 10 phr of tackifier resin (Examples 10-12) resulted in about a three-fold improvement in 180-degree peel adhesion to PP, compared to Example 9 with no tackifier resin added. Unpredictably, about a six-fold increase in peel strength was obtained by adding 14.6 weight percent or about 36.5 phr of Kristalex™ 3070 tackifier resin, Example 13.

TABLE 4

Increase in adhesion with addition of tackifier resin to the composition AcAc Resin 1, CHDAL 1.0 equiv. and 1.5 phr MPMDA. Coverstock was CGT brown PVC. Samples were cured at 120° C. for 2 hours. Standard deviation is in parentheses.

| Ex. # | Additive | wt % additive | Substrate | 180 degree peel (N/25 mm) | % adhesive failure to substrate |
|---|---|---|---|---|---|
| 9 | None | 0 | PP | 0.19 (0.02) | 100 |
| 10 | Kristalex ™ 3070 | 4.1 | PP | 0.6 (0.3) | 95 |
| 11 | Regalite ™ S5090 | 4.1 | PP | 0.6 (0.2) | 95 |
| 12 | Eastman ™ Ester gum 8 | 4.1 | PP | 0.5 (0.2) | 95 |
| 13 | Kristalex ™ 3070 | 14.6 | PP | 1.2 (0.3) | 95 |
| 14 | Regalite ™ S5090 | 14.6 | PP | 0.62 (0.04) | 80 |
| 15 | None | 0 | PC | 18 (4) | 0 (100% cohesive) |
| 16 | Kristalex ™ 3070 | 4.1 | PC | 16 (2) | 0 (100% cohesive) |
| 17 | Regalite ™ S5090 | 4.1 | PC | 14 (1) | 0 (100% cohesive) |
| 18 | Eastman ™ Ester gum 8 | 4.1 | PC | 17 (1) | 0 (100% cohesive) |

Examples 19-20—C5 Resin in a Different Resin Exhibiting Green Strength, Adhesion to Wood and Adhesion to PET The acetoacetylated polyester Resin 3 and curing agent CHDAL were combined in a 2 oz glass jar at AcAc/CHO=1.0 equivalent ratio and 1.5 phr of MPMDA amine was added and mixed. A portion was transferred to an aluminum weighing dish and cryoground Piccotac™ 1095 tackifier resin was added at 45 phr (about 29 wt %). The composition was mixed thoroughly with a wooden tongue depressor (td). Untreated 2 mil PET film from ChemInstruments, OH, USA, was used to prepare laminates. Compositions were drawn down by hand using a wound wire rod on the PET to obtain about a 0.01" film. The end of a tongue depressor was laid in one edge of the composition, and a second piece of PET was laid on the composition and smoothed with the edge of a different tongue depressor to ensure contact between the composition and the second PET substrate.

The bonded tongue depressor/PET were evaluated for green strength until one sample exhibited no movement and the time recorded. The bonded PET/PET and td/PET were then placed in a 60° C. oven for five minutes and allowed to sit at room temperature overnight. The samples were pulled by hand and evaluated for failure mode, Table 5. The composition with tackifier resin unexpectedly exhibited 50% cohesive failure and 25% td substrate failure.

TABLE 5

Composition AcAc/CHO = 1.0, Resin 3, 48.41 g, 7.53 g CHDAL, 0.73 g 1.5 phr MPMDA, 45 phr Piccotac ™ 1095 tackifier resin used as composition bonding a wooden tongue depressor (td) to PET film from ChemInstruments and bonding PET/PET.

| Ex. | RT, slides with effort | RT, no or slight movement | 60° C. 5 min plus RT overnight | PET/PET failure mode | td/PET failure mode |
|---|---|---|---|---|---|
| 19 | 13 min | 39 min | | C | 25% A to PET, 25% substrate failure, 50% C A to PET |
| 20 | Slides | Slides | | A | |

Examples 21-27: Development of Hot Green Strength with Varying Phr of Tackifier Resins Resin 1 and the curing agent, CHDAL, were combined in a 2 oz glass jar at a 1.55 AcAc/CHO equivalent ratio; and 1.55 phr of MPMDA was added and mixed. A portion was transferred to an aluminum weighing dish and cryoground tackifier resin was added as specified in Table 6. The composition was mixed thoroughly with a wooden tongue depressor, and approximately 0.5 inch at the end of two wooden tongue depressors was bonded with the composition at about 0.005" to about 0.01" thickness.

The resistance to sliding in the lengthwise direction of the tongue depressor and the resistance to rotation or "wiggle" about the bonded end were evaluated by applying finger pressure to the top substrate. Build of green strength was determined by the time between bond formation and observation of resistance to sliding and subsequent resistance to rotation/wiggle at the bonded end of the tongue depressors (td).

The bonded substrates were placed in an 80° C. oven for about 90 min (Examples 21-27) or 60 minutes (Examples 28-33), removed and immediately evaluated for green strength while warm. Unpredictably, about 11 phr to about 23 phr tackifier resin provided sufficient green strength when hot/warm to prevent lengthwise sliding of the substrates and most rotation about the bonded end, and about 33 phr to about 56 phr tackifier resin provided sufficient green strength when warm to prevent all or almost all movement of the substrates. Similar results were obtained with Piccotac™ 7590 and Kristalex™ 3070 tackifier resins. Examples 28-33 bonded substrates were placed in a −36° C. chest freezer overnight and all samples with tackifier resin exhibited cohesive failure. Additionally, the cured compositions could not be removed from the aluminum pans in which they were mixed after conditioning overnight at −36° C.

TABLE 6

Evaluation of green strength between tongue depressors evaluated immediately after removal from 80° C. oven. Composition is AcAc/CHO = 1.55; AcAc Resin 1, CHDAL, and 1.55 phr MPMDA amine with various levels of Kristalex ™ 3070 tackifier.

| Example | wt % Kristalex ™ 3070 | phr Kristalex ™ 3070 | 10 min 80° C. | slides with slight effort | slides with effort | slight movement | 93 min at 80° C. | RT failure mode |
|---|---|---|---|---|---|---|---|---|
| 21 | 33 | 56 | slides hot | | | 3 min | with effort slides | C |
| 22 | 29 | 45 | slides hot | | | 3 min | hot | C |
| 23 | 23 | 33 | slides hot | | | 3 min | | C |
| 24 | 17 | 22 | slides hot | | 3 min | | some effort slides | C |
| 25 | 9 | 11 | slides hot | | 3 min | | hot | C |
| 26 | 7 | 8 | slides hot | | | | slight effort slides hot | C |
| 27 | 0 | 0 | slides hot | 3 min | | | slides hot | C |

TABLE 7

Evaluation of green strength between tongue depressors evaluated immediately after removal from 80° C. oven. Composition is AcAc/CHO = 1.55; AcAc Resin 1, CHDAL, and 1.55 phr MPMDA amine with various levels of Piccotac ™ 7590 tackifier.

| Example | wt % Piccotac ™ 7590 | phr Piccotac ™ 7590 | slides freely | some wiggle | no or slight movement |
|---|---|---|---|---|---|
| 28 | 33 | 56 | | | X |
| 29 | 29 | 45 | | | X |
| 30 | 23 | 33 | | | X |
| 31 | 17 | 23 | | X | |
| 32 | 9 | 11 | | X | |
| 33 | 0 | 0 | X | when cooled RT | |

Examples 34-37—Preparation and Testing of Laminates Comprising Tackifier Resin Demonstrating Improved Adhesion to Untreated PET and Green Strength when Hot Tackifier resin was cryogenically ground and added to a mixture of Components (I), (II) and (III) of the invention, more specifically described in the tables herein. Approximately 0.5 inch at the end of two wooden tongue depressors was bonded with the composition at about 0.005" to about 0.01" thickness. The resistance to sliding in the lengthwise direction of the tongue depressor and the resistance to rotation or "wiggle" about the bonded end were evaluated by applying finger pressure to the top substrate. Build of green strength was determined by the time between bond formation and observation of resistance to sliding and subsequent resistance to rotation/wiggle at the bonded end of the wooden tongue depressors. Untreated 2 mil PET film from ChemInstruments, USA, was used to prepare laminates. Compositions were drawn down by hand using a wound wire rod on the PET to obtain about a 0.01" film. The end of a tongue depressor was laid in one edge of the composition, and a second piece of PET was laid on the composition and smoothed with the edge of a different tongue depressor to ensure contact between the composition and the second PET substrate.

The bonded wooden tongue depressors, the PET/PET laminates and the tongue depressor/PET laminates were placed in a 108° C. oven for five minutes, removed, and the green strength while hot (ability to slide the wooden tongue depressors) was evaluated. The samples were cured at ambient temperature for about 2.5 h and then placed in a −36° C. freezer overnight. The green strength and adhesion while cold was then evaluated.

Unpredictably, compositions with 42 phr (26 wt %) and higher had sufficient green strength within three minutes of removal from a 108° C. oven that the bonded tongue depressors did not slide under finger pressure while the control without tackifier resin and the sample with 15 phr (11 wt %) tackifier resin slid easily. After curing at ambient temperature overnight, compositions with 35 phr tackifier resin and higher exhibited cohesive failure for the PET/PET bonds. The bonded tongue depressors exhibited no movement under finger pressure and had cohesive failure when pulled apart after >8 h at −36° C. while the control sample had slight movement and cohesive failure.

TABLE 8

Addition of tackifier resins as Component (IV) of the compositions of the invention provided hot green strength and adhesion to untreated PET film. The composition was AcAc/CHO = 1 with Resin 1, CHDAL, 1.55 phr MPMDA and with the specified tackifier resin in the specified amount.

| Example # | Tackifier | wt % tackifier | phr tackifier | 5 min 108° C. - hot td/td | 5 min 108° C. - hot td/PET | RT 2.5 h plus −36° C. overnight - td/td | RT overnight cure td/PET | RT overnight cure PET/PET |
|---|---|---|---|---|---|---|---|---|
| 33 | Piccotac ™ 7590 | 26 | 42 | no movement | no movement | C -difficult to pull | n.d. | C |
| 34 | Piccotac ™ 1095 | 33 | 59 | no movement | no movement | C | no movement | C |
| 35 | Piccotac ™ 1095 | 23 | 35 | n.d. | no movement | C | no movement | C |
| 36 | Piccotac ™ 1095 | 11 | 15 | Slide | no movement | wood broke, cohesive | no movement | A |
| 37 | Piccotac ™ 1095 | 0 | 0 | Slide | no movement | wiggles; C | no movement | A |

What is claimed is:

1. A curable composition comprising:
   I. Component (I) comprising at least one resin having at least one functional group selected from the group consisting of β-ketoester and malonate functional groups,
   II. Component (II) comprising at least one curing agent having at least one aldehyde functional group, and
   III. Component (III) comprising at least one compound having amine functionality, salts thereof, or combinations thereof;
   IV. Component (IV) which is at least one additive comprising at least one adhesion promoter, at least one green strength enhancer, or combinations thereof, or wherein said at least one additive is both an adhesion promoter and a green strength enhancer.

2. The composition of claim 1 wherein Component (I) is selected from at least one amorphous polyester, at least one semi-crystalline polyester, or at least one polyether, or combinations thereof.

3. The composition of claim 1 wherein the equivalent ratio of the acetoacetate (AcAc) functionality of Component (I) and the aldehyde functionality is from about 4 to about 0.25; or from about 2 to about 0.5; or from about 1.5 to about 0.5; or from about 1.3 to about 0.7; or from about 1.2 to about 0.8.

4. The composition of claim 1 wherein said adhesion promoter is at least one tackifier resin.

5. The composition of claim 1 wherein at least one said tackifier resin is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, terpene resins, terpene phenolic resins, terpene styrene resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof.

6. The composition of claim 5 wherein said tackifier resin is selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and combinations thereof.

7. The composition of claims 1 or 3 wherein said additive is a tackifier which is present in an amount from about 1 phr to about 70 phr, or from about 10 phr to about 60 phr, or from about 10 phr to about 25 phr, based on the total weight of Component (I), the resin.

8. The composition of claim 1 wherein the green bond strength of the composition is increased by addition of Component (IV).

9. The composition of claim 1 wherein Component (II) comprises at least one curing agent having at least two aldehyde functional groups.

10. The composition of claim 1 or 9 wherein Component (I) comprises at least one resin having at least two functional groups selected from the group consisting of β-ketoester and malonate functional groups.

11. The composition of claim 1 or 4 which is a cured composition.

12. The composition of claim 11 wherein the 180-degree peel adhesion and/or T-peel strength of the cured composition is greater than when a tackifier resin or other adhesion promoter is not present in the same composition.

13. The composition of claim 11 wherein the 180-degree peel adhesion of the cured composition is at least 100 percent greater than when tackifier or other adhesion promoter is not present in the same composition.

14. The composition of claim 1 wherein Component (III) comprises at least one amine having primary, secondary, or tertiary amine functionality, or combinations thereof.

15. The composition of claim 1 which is an adhesive composition or a coating composition.

16. The curable composition of claim 1 having initial green strength and cured bond strength wherein:
   (a) Component (I) comprises at least two functional groups selected from the group consisting of 1-ketoester and malonate functional groups;
   (b) Component (II) comprises at least one curing agent having at least two aldehyde functional groups;
   (c) The equivalent ratio of the acetoacetate (AcAc) functionality of Component (I) and the aldehyde functionality is from about 3:0.25, or from about 3:0.5, or from about 2.5:0.25, or from about 2.5:0.5, or from about 2.5:0.6, or from about 2:0.25, or from about 2:0.5, or from about 2:0.6, or from about 1.2:0.8;
   (d) Component (III) is at least one amine having primary, secondary, or tertiary amine functionality, or combinations thereof;
   (e) Component (IV) is at least one tackifier resin, wherein:
      a. said tackifier resin is present in an amount from about 1 phr to about 70 phr, or from about 10 phr to about 60 phr, or from about 10 phr to about 25 phr, based on the total weight of Component (I), the resin; and,
      b. said at least one said tackifier resin is selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof; and wherein the 180-degree peel strength and/or T-peel strength of the composition is greater than when a tackifier resin or other adhesion promoter is not present in the same composition.

17. The process of applying the composition of claim 1 to a substrate and subsequently laminating to another substrate.

18. A process for preparing an assembly component comprising
a. applying the curable composition of claim 1 in any order to the surface of at least one layer of a substrate,
b. forming a laminate by contacting the surfaces to be adhered each with the other, and
c. curing said curable composition.

19. An article of manufacture comprising the composition of claim 1.

20. An article comprising said composition of claim 1 selected from at least one of the following:
an adhesive, a laminate, a tape, a label, a tag, a radio frequency identification (RFID) tag, a coating, a sealant, a flexible or non-flexible film, a foam, a potting compound, composite, a disposable hygiene article, a fiberglass reinforced plastic, a compound, an assembly part, a motor vehicle molded part, a motor vehicle extruded part, a motor vehicle laminated part, a furniture part, fabric, a woven textile, a nonwoven, a flexible packaging multilayer;

wherein the adhesive is selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, assembly part adhesive, structural adhesive, pressure sensitive adhesive, pressure sensitive adhesive tape, pressure sensitive adhesive label, pressure sensitive adhesive protective film, laminating adhesive, packaging adhesive, flexible film adhesive, flexible packaging adhesive, hygiene core integrity adhesive, hygiene core integrity adhesive, and solvent-based adhesives;

wherein said composite is selected from at least one of a polyester composite, a glass composite, or a wood-plastic composite; and wherein said compound is selected from at least one of an extruded compound, a polyacrylic blended compound, a potting compound, a rubber compound, a sheet molding compound or a dough molding compound.

\* \* \* \* \*